(12) United States Patent
Ramamoorthy et al.

(10) Patent No.: US 12,349,230 B2
(45) Date of Patent: Jul. 1, 2025

(54) METHODS AND SYSTEMS FOR HANDLING MULTIMEDIA BROADCAST MULTICAST SERVICES (MBMS) IN WIRELESS NETWORK

(71) Applicant: Samsung Electronics Co., Ltd., Suwon-si (KR)

(72) Inventors: Arunprasath Ramamoorthy, Bangalore (IN); Basavaraj Jayawant Pattan, Bangalore (IN); Kiran Gurudev Kapale, Bangalore (IN); Nishant Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 17/845,408

(22) Filed: Jun. 21, 2022

(65) Prior Publication Data

US 2022/0408521 A1    Dec. 22, 2022

(30) Foreign Application Priority Data

Jun. 18, 2021  (IN) .............................. 202141027411
May 31, 2022  (IN) ............................ 2021 41027411

(51) Int. Cl.
    *H04H 20/71*      (2008.01)
    *H04W 4/06*       (2009.01)
    *H04W 76/40*      (2018.01)
(52) U.S. Cl.
    CPC .............. *H04W 76/40* (2018.02); *H04W 4/06* (2013.01)
(58) Field of Classification Search
    CPC ................................ H04W 76/40; H04W 4/06
    (Continued)

(56) References Cited

U.S. PATENT DOCUMENTS

| | | | |
|---|---|---|---|
| 11,019,465 B2 | 5/2021 | Gundur et al. | |
| 2011/0053490 A1 | 3/2011 | Wu | |
| 2022/0159416 A1* | 5/2022 | Solano Arenas | ....... H04W 4/06 |

FOREIGN PATENT DOCUMENTS

| | | |
|---|---|---|
| EP | 1737254 A1 | 12/2006 |
| WO | 2020/169574 A1 | 8/2020 |

OTHER PUBLICATIONS

Indian Office Action dated Dec. 27, 2022, issued in an Indian Application No. 202141027411.

(Continued)

*Primary Examiner* — Temica M Beamer
(74) *Attorney, Agent, or Firm* — Jefferson IP Law, LLP

(57) ABSTRACT

Methods for handling Media-based Modulation (MBM) in a wireless network (1000) by a Mission Critical (MC) Gateway (GW) User Equipment (UE) (300) are provided. The method includes storing information associated with an identifier at the MC gateway UE (300) in response to receiving an MC gateway Multimedia Broadcast Multicast Services (MBMS) bearer announcement from an MC client (100). The MC gateway UE (300) uses the identifier and the information to activate for monitoring the MBMS bearer by the MC gateway UE (300). Further, the method includes sending an MBMS listening status report to the MC client (100) based on the MC GW MBMS bearer announcement. Further, the method includes establishing a communication channel with the MC client (100) based on a parameter to receive an MC service data from the MC gateway UE (300), where the MC gateway UE (300) forwards the MC service data to the MC client (100).

20 Claims, 19 Drawing Sheets

(58) Field of Classification Search
USPC .......................................................... 370/312
See application file for complete search history.

(56) References Cited

OTHER PUBLICATIONS

3rd Generation Partnership Project; Technical Specification Group Services and System Aspects; Study on Support of a Gateway UE Function for Mission Critical Communication; (Release 18), 3GPP TR 23.700-79 V1.0.0, Jun. 2021.
3rd Generation Partnership Project; Technical Specification Group Services and System Aspects; Common functional architecture to support mission critical services; Stage 2 (Release 17), 3GPP TS 23.280 V17.6.0, Apr. 2021.
3rd Generation Partnership Project; Technical Specification Group Services and System Aspects; Functional architecture and information flows to support Mission Critical Video (MCVideo); Stage 2 (Release 17), 3GPP TS 23.281 V17.5.0, Dec. 2020.
3rd Generation Partnership Project; Technical Specification Group Services and System Aspects; Functional architecture and information flows to support Mission Critical Push To Talk (MCPTT); Stage 2 (Release 17), 3GPP TS 23.379 V17.6.0, Apr. 2021.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), 3GPP TS 36.300 V16.5.0, Mar. 2021.
3rd Generation Partnership Project; Technical Specification Group Services and System Aspects; Group Communication System Enablers for LTE (GCSE_LTE); Stage 2 (Release 16), 3GPP TS 23.468 V16.0.0, Jul. 2020.
Nokia et al., 'Further clarifying of the Functional architecture', S6-211189, 3GPP TSG SA WG6 Meeting #43-e, May 19, 2021.
Uic et al., 'Pseudo-CR on MC GW UE functional architecture reference point refinement', S6-211216, 3GPP TSG SA WG6 Meeting #43-e, May 19, 2021.
Uic et al., 'Pseudo-CR on MC gateway UE use of MC client IP addresses and MC gateway UE client IP address', S6-211236, 3GPP TSG SA WG6 Meeting #43-e, May 19, 2021.
Samsung et al., 'Pseudo-CR on supporting MBMS bearer for MC Service clients residing on non-3GPP device', S6-211733, 3GPP TSG SA WG6 Meeting #44-e, Jul. 17, 2021.
3GPP; TSG SA; Study on support of a gateway UE function for mission critical communication; (Release 18), 3GPP TR 23.700-79 V18.0.0 (Sep. 2021), Sep. 25, 2021.
International Search Report and Written Opinion dated Sep. 20, 2022, issued in International Patent Application No. PCT/KR2022/008717.
Extended European Search Report dated Feb. 21, 2025, issued in European Patent Application No. 24217889.5.

* cited by examiner

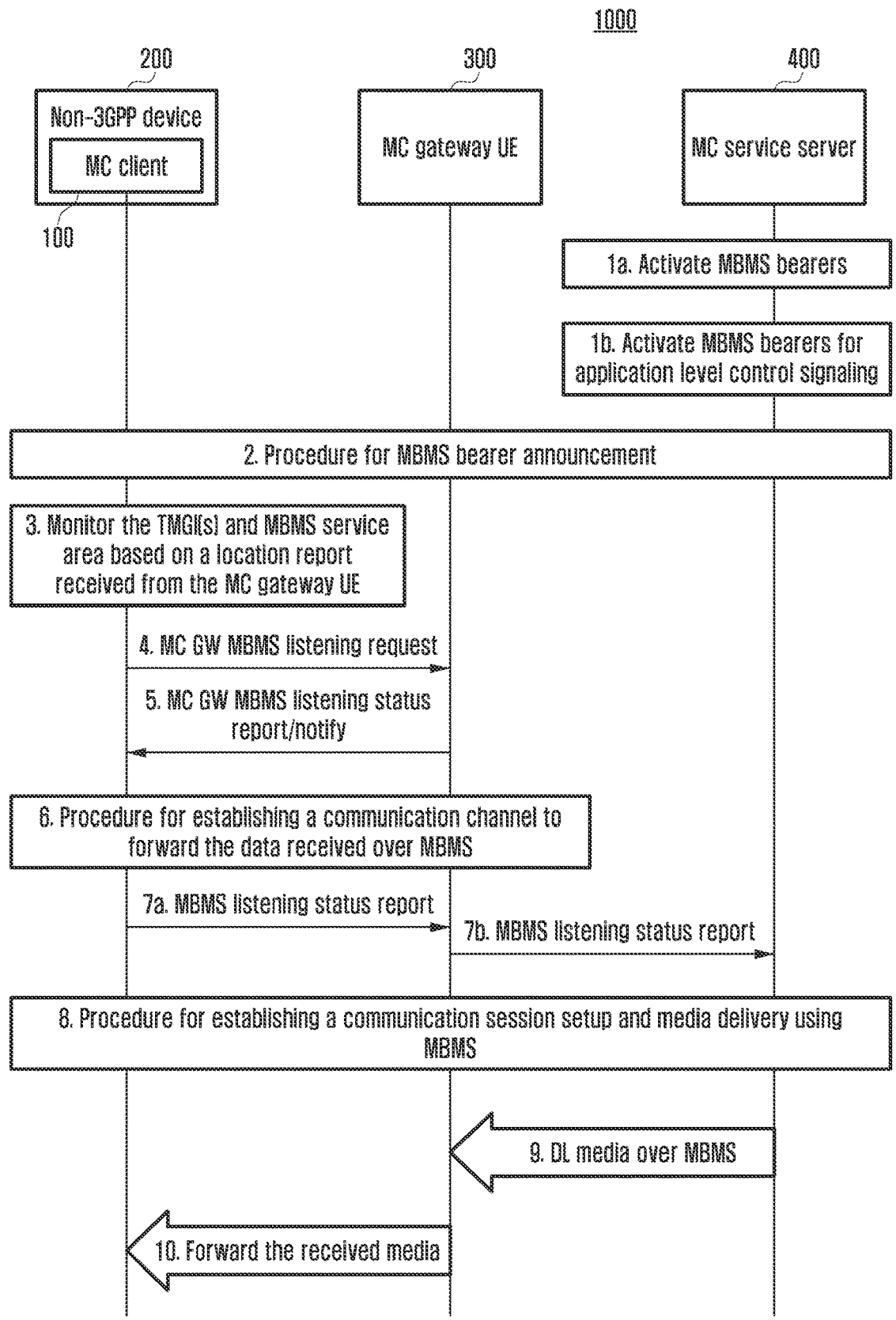

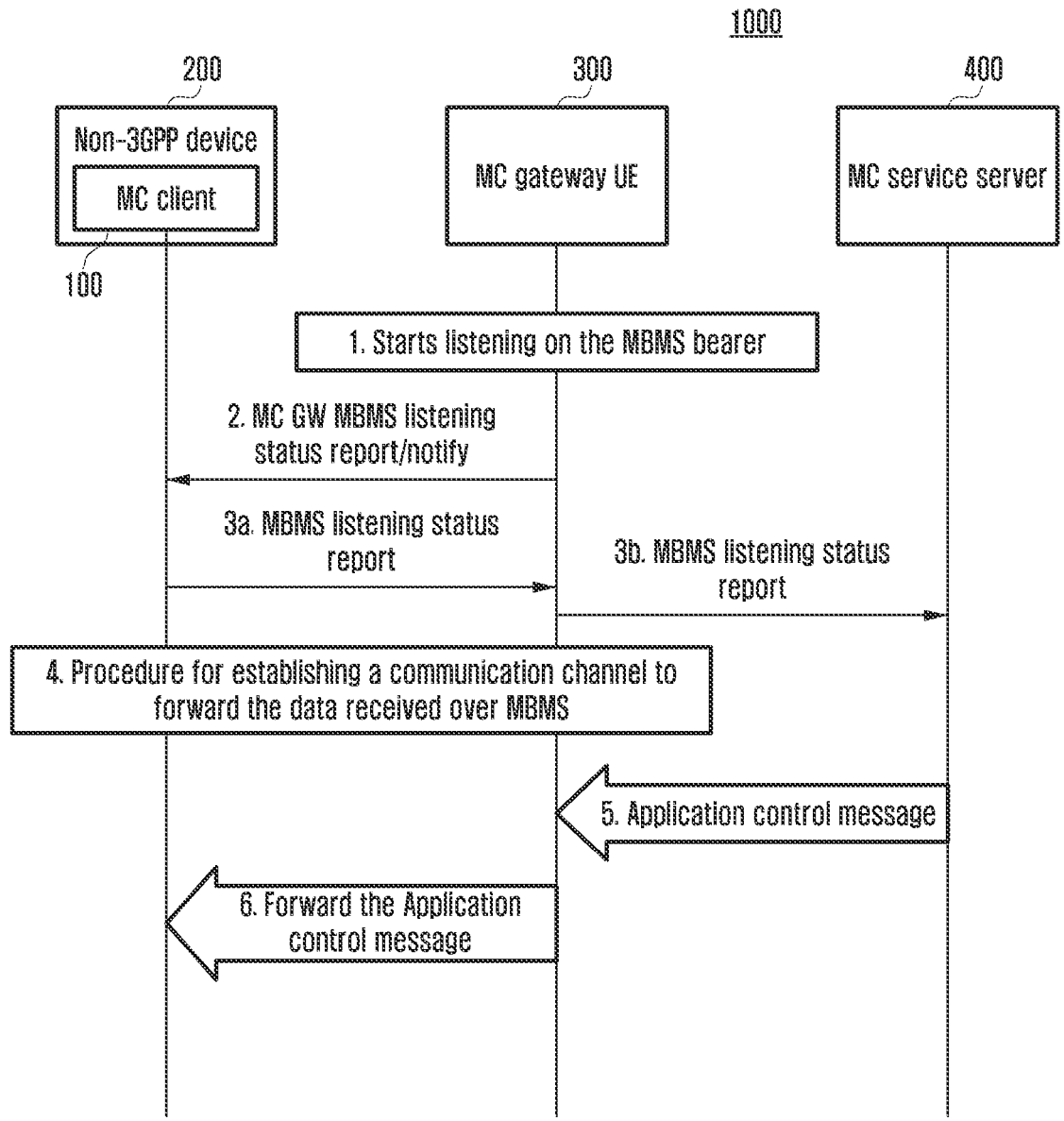

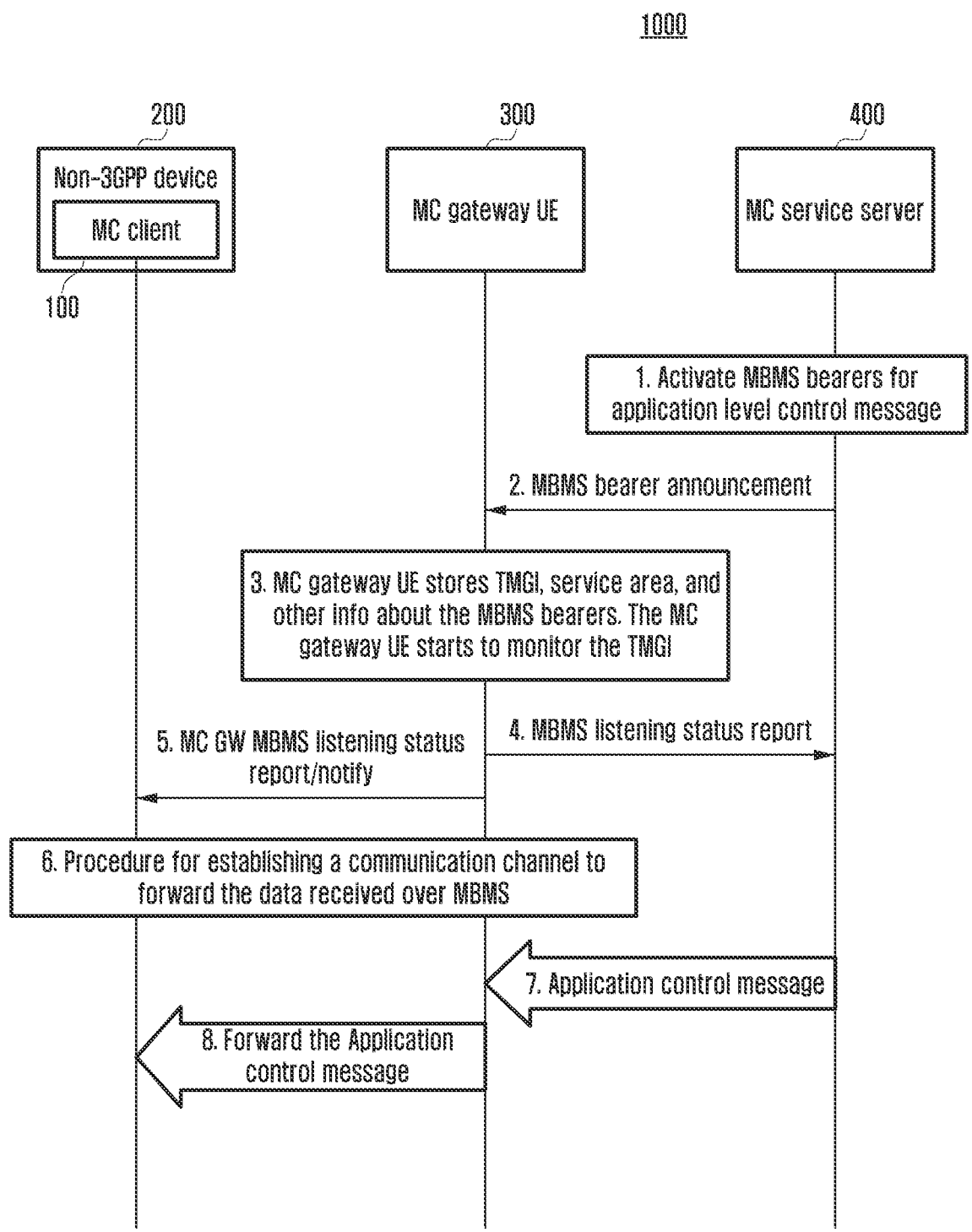

METHODS AND SYSTEMS FOR HANDLING MULTIMEDIA BROADCAST MULTICAST SERVICES (MBMS) IN WIRELESS NETWORK

CROSS REFERENCE TO RELATED APPLICATION(S)

This application is based on and claims priority under 35 U.S.C. § 119(a) of an Indian provisional patent application number 202141027411, filed on Jun. 18, 2021, in the Indian Patent Office, and of an Indian Complete patent application number 202141027411, filed on May 31, 2022, in the Indian Patent Office, the disclosure of each of which is incorporated by reference herein in its entirety.

BACKGROUND

1. Field

The disclosure relates to Mission Critical (MC) services. More particularly, the disclosure relates to systems and methods of supporting Multimedia Broadcast Multicast Services (MBMS) features for Mission Critical Service (MCX) clients residing on non $3^{rd}$ Generation Partnership Project (3GPP) devices accessing an MC system through an MC Gateway (GW) User Equipment (UE) as specified in 3GPP TR 23.700-79.

2. Description of Related Art

With MBMS features, a network provider can broadcast group communications for mission critical services more efficiently than compared to a unicast technology. As per 3GPP TR 23.700-79, the MC clients can reside on non-3GPP devices and access an MC system through an MC gateway UE. Basically, these devices would not be able to avail the MBMS services, since they do not have access to a 3GPP network. Since the MC gateway UE has access to a 3GPP network, the MC gateway UE shall receive the communications over an MBMS bearer and forward the same to the MC clients behind it.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide systems and methods of supporting Multimedia Broadcast Multicast Services (MBMS) features for mission critical (MC) service (MCX) clients residing on non $3^{rd}$ generation partnership project (3GPP) devices accessing an MC System through an MC Gateway user equipment (UE) as specified in 3GPP TR 23.700-79. The proposed methods assist the MC clients residing on non-3GPP devices to receive an MC communication over MBMS bearer without wasting network resources, hence, the MC system can operate in an efficient way to improve MBMS services. The proposed methods require only minimal or no changes at an MC service server side in order to support MC communication over the MBMS bearer for the MC clients residing on non 3GPP devices.

Additional aspects will be set forth in part in the description which follows and, in part, will be apparent from the description, or may be learned by practice of the presented embodiments.

In accordance with an aspect of the disclosure, methods for handling Multimedia Broadcast Multicast Services (MBMS) in a wireless network is provided. The method includes receiving, by a mission critical (MC) gateway (GW) user equipment (UE), an MC gateway MBMS bearer announcement from an MC client in response to receiving information associated with an MBMS bearer and a service description associated with the MBMS bearer from an MC service server. The MC GW MBMS bearer announcement comprises MBMS bearer related information. Further, the method includes storing, by the MC gateway UE, information associated with an identifier at the MC gateway UE in response to receiving the MC gateway MBMS bearer announcement from the MC client. The MC gateway UE uses the identifier and the information to activate for monitoring the MBMS bearer by the MC gateway UE. Further, the method includes sending, by the MC GW UE, an MBMS listening status report to the MC client based on the MC GW MBMS bearer announcement. Further, the method includes establishing, by the MC gateway UE, a communication channel with the MC client based on a parameter to receive an MC service data from the MC gateway UE, wherein the MC gateway UE forwards the MC service data to the MC client.

In an embodiment, further, the method includes sending, by the MC gateway UE, an MC GW MBMS bearer quality report to the MC client. Further, the method includes receiving, by the MC gateway UE, the MBMS listening status report from the MC client based on the MC GW MBMS bearer quality report to send or forward to the MC service server. The MBMS listening status report comprises at least one of an MC GW MBMS bearer quality report and information about neighboring MBMS bearer.

In an embodiment, further, the method includes receiving, by the MC gateway UE, an MC GW MapGroupToBearer request message from the MC client in response to receiving a MapGroupToBearer message, at the MC client, from an MC service server over a previously activated MBMS bearer, where the MC GW MapGroupToBearer request message comprises details comprised in the MapGroupToBearer message. Further, the method includes maintaining, by the MC gateway UE, an association between a GW MC service identity (ID) and corresponding MBMS sub channel based on the MC GW MapGroupToBearer request message. Further, the method includes sending, by the MC gateway UE, an MC GW MapGroupToBearer response message to the MC client based on the MC GW MapGroupToBearer request message, where the MC GW MapGroupToBearer response message comprises details of non 3rd generation partnership project (3GPP) transport communication related parameters. Further, the method includes establishing, by the MC client, the communication channel with the MC gateway UE based on the non 3GPP transport communication related parameters to receive an MC service group communication data from the MC gateway UE. Further, the method includes sending, by the MC gateway UE, a downlink media received over the MBMS bearer to the MC client.

In an embodiment, further, the method includes receiving, by the MC gateway UE, an MBMS suspension indication message from a network, where the MBMS suspension reporting instruction message is included in an MBMS bearer announcement message. Further, the method includes sending, by the MC gateway UE, an MC GW MBMS suspension indication to the MC client, where the MC client sends an MBMS suspension report to the MC service server via the MC gateway UE based on the MBMS suspension reporting instruction message and the MC GW MBMS suspension indication.

In an embodiment, the MC client resides on a non-3GPP device.

In an embodiment, the MapGroupToBearer message comprises association information between at least one event and the MBMS bearer, where the MapGroupToBearer message comprises an MC service group ID, information about a media stream identifier of the activated MBMS bearer, and an identifier of the MBMS bearer broadcasting the at least one event.

In an embodiment, the MC GW UE sends the MBMS listening status report to the MC client upon determining that the MC GW UE is entering or is in a service area of at least one announced Temporary Mobile Group Identity (TMGI) to indicate that the MC GW UE can receive the media or signaling or application data over the MBMS bearer.

In accordance with another aspect of the disclosure, method for handling MBMS in a wireless network is provided. The method includes sending, by an MC client, an MC GW MBMS bearer announcement to an MC gateway UE in response to receiving information associated with an MBMS bearer and a service description associated with the MBMS bearer from an MC service server. The MC GW MBMS bearer announcement comprises MBMS bearer related information. Further, the method includes receiving, by the MC client, an MBMS listening status report from the MC gateway UE based on the MC GW MBMS bearer announcement. Further, the method includes establishing, by the MC client, a communication channel with the MC gateway UE based on at least one parameter to receive MC service data from the MC gateway UE. The MC gateway UE forwards the MC service data to the MC client over the communication channel.

In an embodiment, further, the method includes sharing, by the MC client, the MBMS listening status report to the MC service server based on the MC GW MBMS listening status report, wherein the MBMS listening status report indicates that the MC service client receives the media over the MBMS bearer.

In an embodiment, further, the method includes receiving, by the MC client, an MC GW MBMS bearer quality report from the MC gateway UE. Further, the method includes sharing, by the MC client, the MBMS listening status report to the MC service server based on the MC GW MBMS bearer quality report, wherein the MBMS listening status report comprises at least one of an MC GW MBMS bearer quality report and information about neighboring MBMS bearer.

In an embodiment, further, the method includes receiving, by the MC client, a MapGroupToBearer message from the MC service server over a previously activated MBMS bearer. Further, the method includes sending, by the MC client, an MC GW MapGroupToBearer request message to the MC gateway UE, wherein the MC GW MapGroupToBearer request message comprises details comprised in the MapGroupToBearer message. Further, the method includes receiving, by the MC client, an MC GW MapGroupToBearer response message from the MC gateway UE based on the MC GW MapGroupToBearer request message, wherein the MC GW MapGroupToBearer response message comprises details of non 3GPP transport communication related parameters. Further, the method includes establishing, by the MC client, the communication channel with the MC gateway UE based on the non 3GPP transport communication related parameters to receive an MC service group communication data from the MC gateway UE. Further, the method includes receiving, by the MC client, a downlink media from the MC gateway UE.

In an embodiment, further, the method includes receiving, by the MC client, an MBMS suspension reporting instruction message from the MC service server, wherein the MBMS suspension reporting instruction message is included in an MBMS bearer announcement message. Further, the method includes receiving, by the MC client, an MC GW MBMS suspension indication from the MC gateway UE. Further, the method includes sending, by the MC client, an MBMS suspension report to the MC service server via the MC gateway UE based on the MBMS suspension reporting instruction message and the MC GW MBMS suspension indication.

Accordingly, the embodiments herein provide an MC GW UE for handling MBMS in a wireless network. The MC GW UE includes an MBMS controller coupled with a memory and a processor. The MBMS controller is configured to receive an MC gateway MBMS bearer announcement from an MC client in response to receiving information associated with an MBMS bearer and a service description associated with the MBMS bearer from an MC service server. The MC GW MBMS bearer announcement comprises MBMS bearer related information. Further, the MBMS controller is configured to store information associated with an identifier at the MC gateway UE in response to receiving the MC gateway MBMS bearer announcement from the MC client. The MC gateway UE uses the identifier and the information to activate monitoring of the MBMS bearer by the MC gateway UE. Further, the MBMS controller is configured to send an MBMS listening status report to the MC client based on the MC GW MBMS bearer announcement. Further, the MBMS controller is configured to establish a communication channel with the MC client based on a parameter to receive the MC service data from the MC gateway UE. The MC gateway UE forwards the MC service data to the MC client over the communication channel.

Accordingly, the embodiments herein provide an MC client for handling MBMS in a wireless network. The MC client includes an MBMS controller coupled with a memory and a processor. The MBMS controller is configured to send an MC GW MBMS bearer announcement to an MC gateway UE in response to receiving information associated with an MBMS bearer and a service description associated with the MBMS bearer from an MC service server, wherein the MC GW MBMS bearer announcement comprises MBMS bearer related information. Further, the MBMS controller is configured to receive an MBMS listening status report from the MC gateway UE based on the MC GW MBMS bearer announcement. Further, the MBMS controller is configured to establish a communication channel with the MC gateway UE based on at least one parameter to receive MC service data from the MC gateway UE. The MC gateway UE forwards the MC service data to the MC client over the communication channel.

Other aspects, advantages, and salient features of the disclosure will become apparent to those skilled in the art from the following detailed description, which, taken in conjunction with the annexed drawings discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1A illustrates a procedure of how a mission critical (MC) client requests an MC gateway (GW) user equipment (UE) to start listening on a Multimedia Broadcast Multicast Services (MBMS) bearer, according to an embodiment of the disclosure;

FIG. 3 depicts a procedure, wherein only one of receiving MC service clients uses an MBMS bearer, according to an embodiment of the disclosure;

FIG. 13 depicts a procedure, wherein only one of the receiving MC service clients uses an MBMS bearer, according to an embodiment of the disclosure;

Throughout the drawings, it should be noted that like reference numbers are used to depict the same or similar elements, features, and structures.

DETAILED DESCRIPTION

Figure 1B:
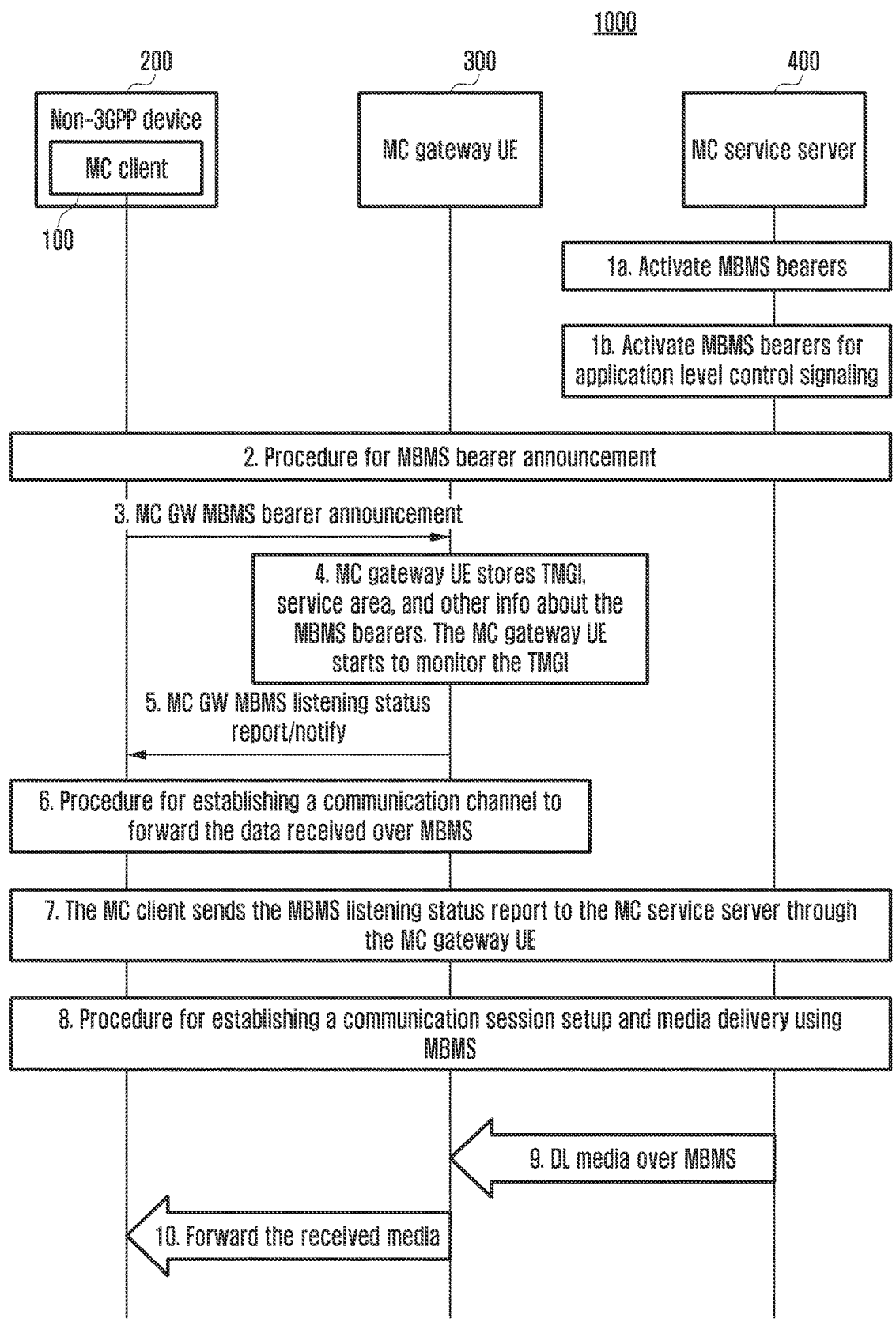
FIG. 1B illustrates the procedure of how the MC client shares details of MBMS service announcement to the MC gateway UE, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein achieve methods for handling Multimedia Broadcast Multicast Services (MBMS) in a wireless network. The method includes receiving, by a mission critical (MC) gateway (GW) user equipment (UE), an MC gateway MBMS bearer announcement from an MC client in response to receiving information associated with an MBMS bearer and a service description associated with the MBMS bearer from an MC service server. The MC GW MBMS bearer announcement comprises MBMS bearer related information. Further, the method includes storing, by the MC gateway UE, information associated with an identifier at the MC gateway UE in response to receiving the MC gateway MBMS bearer announcement from the MC client. The MC gateway UE uses the identifier and the information to activate for monitoring the MBMS bearer by the MC gateway UE. Further, the method includes sending, by the MC GW UE, an MBMS listening status report to the MC client based on the MC GW MBMS bearer announcement. Further, the method includes establishing, by the MC gateway UE, a communication channel with the MC client based on a parameter to receive an MC service data from the MC gateway UE, wherein the MC gateway UE forwards the MC service data to the MC client.

The proposed methods assist the MC clients residing on non-3GPP devices to receive an MC communication over MBMS bearer without wasting network resources, hence, the MC system can operate in an efficient way to improve MBMS services. Some of the proposed methods require only minimal or no changes at an MC service server side in order to support MC communication over the MBMS bearer for the MC clients residing on non $3^{rd}$ generation partnership project (3GPP) devices.

Referring now to the drawings, and more particularly to FIGS. 1A, 1B, 2A, 2B, 3 to 13, 14A, 14B, 15, and 16, where similar reference characters denote corresponding features consistently throughout the figures, there are shown at least one embodiment.

3GPP TR 23.700-79 studies about the key issues and solutions to enable MC clients (100) residing on the non 3GPP devices (200) to access an MC system through an MC gateway UE (300). The MC gateway UE (300) resides on the device, which has access a 3GPP network and it acts a bridge connecting the MC clients (100) on the non 3GPP devices (200) and the MC system. From hereafter, the term MC clients (100) when used herein, it always refers to the MC clients (100) residing on the non 3GPP devices (200). Embodiments herein disclose information flows and procedures for MBMS usage that applies to MC services and how the MC gateway UE (300) can be allowed to use the MBMS bearer for Mission critical services related communications and forward the data received over the MBMS bearer to the intended MC clients (100) it is serving. Embodiments herein discuss the following approaches and the related procedures for supporting MBMS usage for the MC clients (100) residing on the non 3GPP devices (200):

Approach 1: The MC system is transparent to the MC clients (100), that it is serving during the MBMS bearer usage; i.e., whether they are accessing the MC system from the 3GPP devices or accessing it from the non 3GPP devices (200) through the MC gateway UE (300).

Approach 2: The MC system is aware about the fact that it is also serving the MC clients (100) residing on the non 3GPP devices (200) during the MBMS bearer usage. This approach requires the MC gateway UE (300) to process the MBMS information related messages like MBMS bearer announcement, and so on.

Approach 1: The MC system is transparent of the MC clients (100), it is serving during the MBMS bearer usage, i.e., whether they are accessing the MC system from 3GPP devices or accessing it from the non 3GPP devices (200) through the MC gateway UE (300).

With this approach, the MC servers intending to use the MBMS bearer for communication do not have to keep track of the MC clients (100) residing on the non 3GPP devices (200) and treat them specially during the MBMS bearer usage.

Use of pre-established bearers: 3GPP TS 23.280 Clause 10.7.3.1 specifies the procedures for using the pre-established MBMS bearers. In this case, the MC service server (400) pre-establishes MBMS bearer(s) in certain pre-configured areas before the initiation of the group communication session. When the user originates a request for a group communication session for one of these areas, the pre-established MBMS bearer(s) is used for the downlink (DL) media transmission. In Approach 1, embodiments herein propose how the pre-established MBMS bearer can be used when there are MC clients (100) accessing the MC system via the MC gateway UE (300) and without any changes at the MC system side. The MC system will be totally transparent about the fact that there are MC clients (100) which are residing on the non 3GPP devices (200). The MC system pre-establishes the MBMS bearers and announces the same to the MC clients (100).

Whenever the MC clients (100) receives the MBMS bearer announcement for the pre-stablished MBMS bearer from the MC system, the MC clients (100) stores temporary mobile group identities (TMGIs), service area and other info about the MBMS bearer(s), the MC service UE starts to monitor the TMGI(s). Since the MC client (100) is residing on the non 3GPP devices (200), it sends the MC GW location reporting configuration to the MC gateway UE (300) in order to fetch the details of the location information related to a 3GPP access network (MBMS Service Area Identities (MBMS SAIs), MBMS single frequency network (MBSFN)) from the MC gateway UE (300). Based on the location report received from the MC gateway UE (300), the MC client can monitor whether they are entering into any of the MBMS SAIs received in the MBMS bearer announcement from the MC System. On detection of entering into the MBMS Service Area, the MC client (100) requests the MC gateway UE (300) to start listening on the MBMS bearer by sending the required details.

FIG. 1A illustrates the procedure of how an MC client requests an MC gateway UE to start listening on the MBMS bearer according to an embodiment of the disclosure. In this procedure, the MC client (100) starts monitoring the MBMS service areas based on the location information received from the MC gateway UE (300).

Below are the pre-conditions for the procedures explained in the FIG. 1A.

The MC client (100) has been configured with the necessary parameters needed for connectivity with the MC gateway UE (300).

The MC client (100) has been receiving the 3GPP access network related location information from the MC gateway UE (300).

Operation 1a, the MC service server (400) determines to activate the MBMS bearer. The activation of the MBMS bearer is done on the MB2-C reference point and according to 3GPP TS 23.468. The bearer will be used for the MC communication media.

Operation 1b, optionally, the MC service server (400) may also activate an MBMS bearer dedicated for application level control signaling. The activation of the MBMS bearer is done on MB2-C reference point and according to 3GPP TS 23.468.

Operation 2, the MC service server (400) passes the MBMS bearer info for the service description associated with the pre-established MBMS bearer to the MC service client through the MC gateway UE (300). Optionally, the MC service server (400) may pass the MBMS bearer info for the service description associated with the pre-established floor control MBMS bearer to the MC service client. The MC service client obtains the TMGI, identifying the MBMS bearer, from the service description.

Operation 3, the MC client (100) stores the MBMS bearer related information and starts monitoring whether it is entering into any of MBMS service areas received in the MBMS bearer announcement.

Operation 4, the MC client (100) that enters or is in the service area of at least one announced TMGI MC client (100) requests the MC gateway UE (300) to start listening on the MBMS bearer by sending MC GW MBMS listening request containing the details of the MBMS bearer.

Operation 5, the MC gateway UE (300) confirms the MC client (100) that it is able to listen on the MBMS bearer by sending the MC GW MBMS listening status report/notify. The MC GW MBMS listening status report also contains the details of the non 3GPP transport communication related parameters.

Operation 6, the MC client (100) establishes the communication channel with the MC gateway UE (300) based on the parameters received in operation 5 to receive the MC service data from the MC gateway UE (300). The MC gateway UE (300) forwards the MC service data it received over the MBMS bearer from the MC service server (400) to the MC client (100) over the communication channel.

Operation 7, the MC Client (100) sends the MBMS listening status report to the MC service server (400) indicating that it is able to receive the media over MBMS, whereby the MC service server (400) may decide to use the MBMS bearer instead of unicast bearer for MC communication sessions.

Operation 8, the MC service group communication session is established.

Operation 9, as the MC service server (400) transmits the media over the MBMS bearer, the media packets are detected and delivered to the MC service client.

Operation 10, the MC gateway UE (300) forwards the received media to the MC client (100).

Between MC client (100) and MC gateway UE (300) the communication mechanism could be Unicast, multicast or broadcast.

FIG. 1B illustrates the procedure of how an MC client shares the details of MBMS service announcement to an MC gateway UE according to an embodiment of the disclosure. In this procedure, the MC client (100) do not have to monitor the location information to detect whether it is entering into the MBMS service area or not. The MC gateway UE (300) monitors and starts listening on the MBMS bearer.

Below are the pre-conditions for the procedures explained in the FIG. 1B.

The MC client (100) has been configured with the necessary parameters needed for connectivity with the MC gateway UE (300).

Operation 1a, the MC service server (400) determines to activate MBMS bearer. The activation of the MBMS bearer is done on the MB2-C reference point and according to 3GPP TS 23.468. The bearer will be used for the MC communication media.

Operation 1b, optionally, the MC service server (400) may also activate an MBMS bearer dedicated for application level control signaling. The activation of the MBMS bearer is done on MB2-C reference point and according to 3GPP TS 23.468.

Operation 2, the MC service server (400) passes the MBMS bearer info for the service description associated with the pre-established MBMS bearer to the MC service client through the MC gateway UE (300). Optionally the MC service server (400) may pass the MBMS bearer info for the service description associated with the pre-established floor control MBMS bearer to the MC service client.

Operation 3, the MC client (100) sends the MC GW MBMS Bearer announcement to the MC gateway UE (300) containing the MBMS bearer related information.

Operation 4, the MC gateway UE (300) stores the information associated with the TMGI(s). The MC gateway UE (300) uses the TMGI and other MBMS bearer related information to activate the monitoring of the MBMS bearer by the MC gateway UE (300).

Operation 5, the MC gateway UE (300) that enters or is in the service area of at least one announced TMGI notifies to the MC client (100) that it can receive media over MBMS by sending the MC GW MBMS listening status report/notify. The MC GW MBMS listening status report also contains the details of the non 3GPP transport communication related parameters.

Operation 6, the MC client (100) establishes the communication channel with the MC gateway UE (300) based on the parameters received in operation 5 to receive the MC service data from the MC gateway UE (300). The MC gateway UE (300) forwards the MC service data it received over the MBMS bearer from the MC service server (400) to the MC client (100) over the communication channel.

Operation 7, the MC Client (100) sends the MBMS listening status report to the MC Server indicating that it is able to receive the media over the MBMS, whereby the MC service server (400) may decide to use the MBMS bearer instead of unicast bearer for MC communication sessions.

Operation 8, the MC service group communication session is established.

Operation 9, as the MC service server (400) transmits the media over the MBMS bearer, the media packets are detected and delivered to the MC gateway UE (300) over the MBMS bearer.

Operation 10, the MC gateway UE (300) forwards the received media to the MC client (100).

Between the MC client (100) and the MC gateway UE (300), the communication mechanism could be Unicast, multicast or broadcast.

Figure 2A:
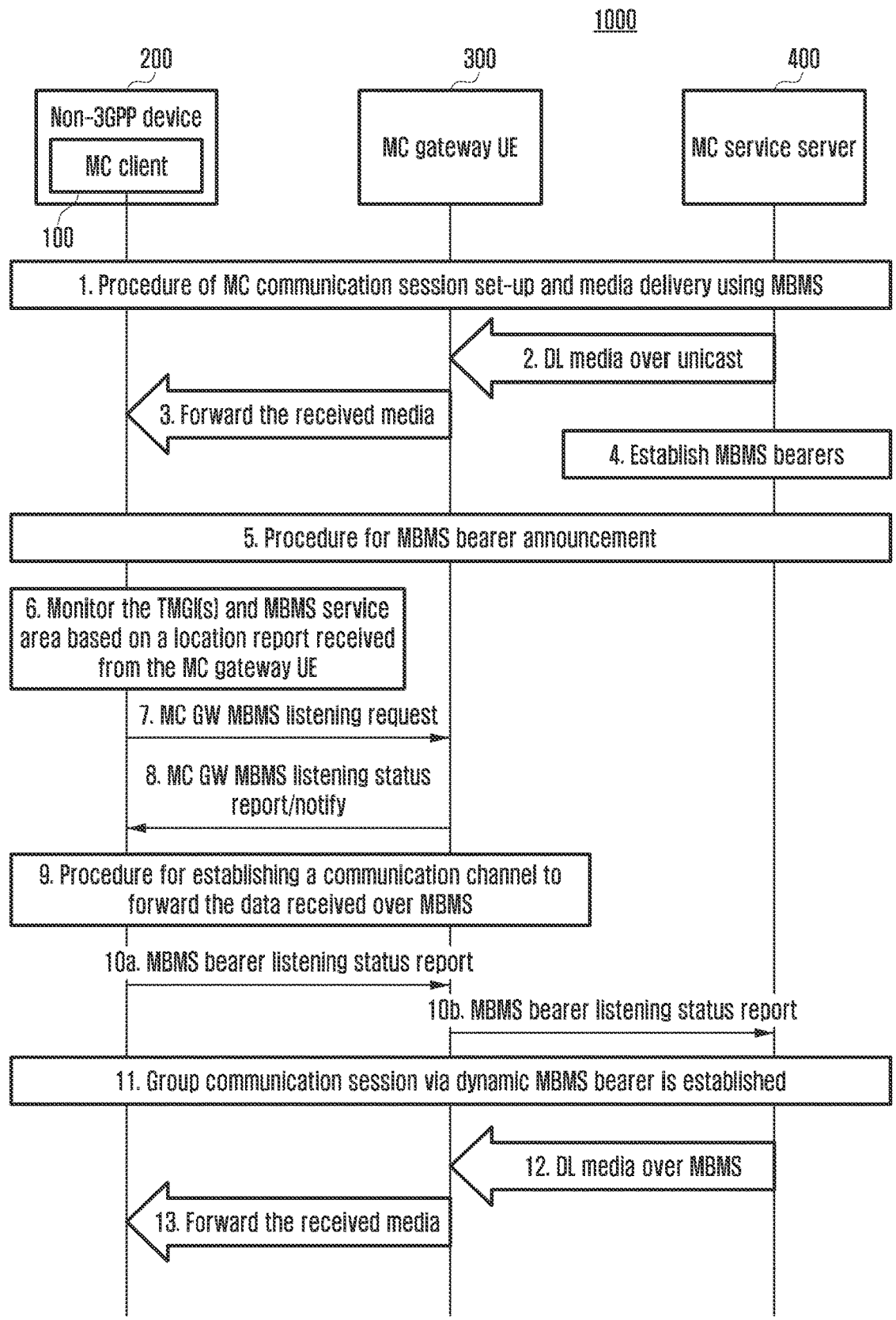
FIGS. 2A and 2B illustrate a mechanism of dynamic MBMS bearer establishments, according to various embodiments of the disclosure.
Figure 2B:
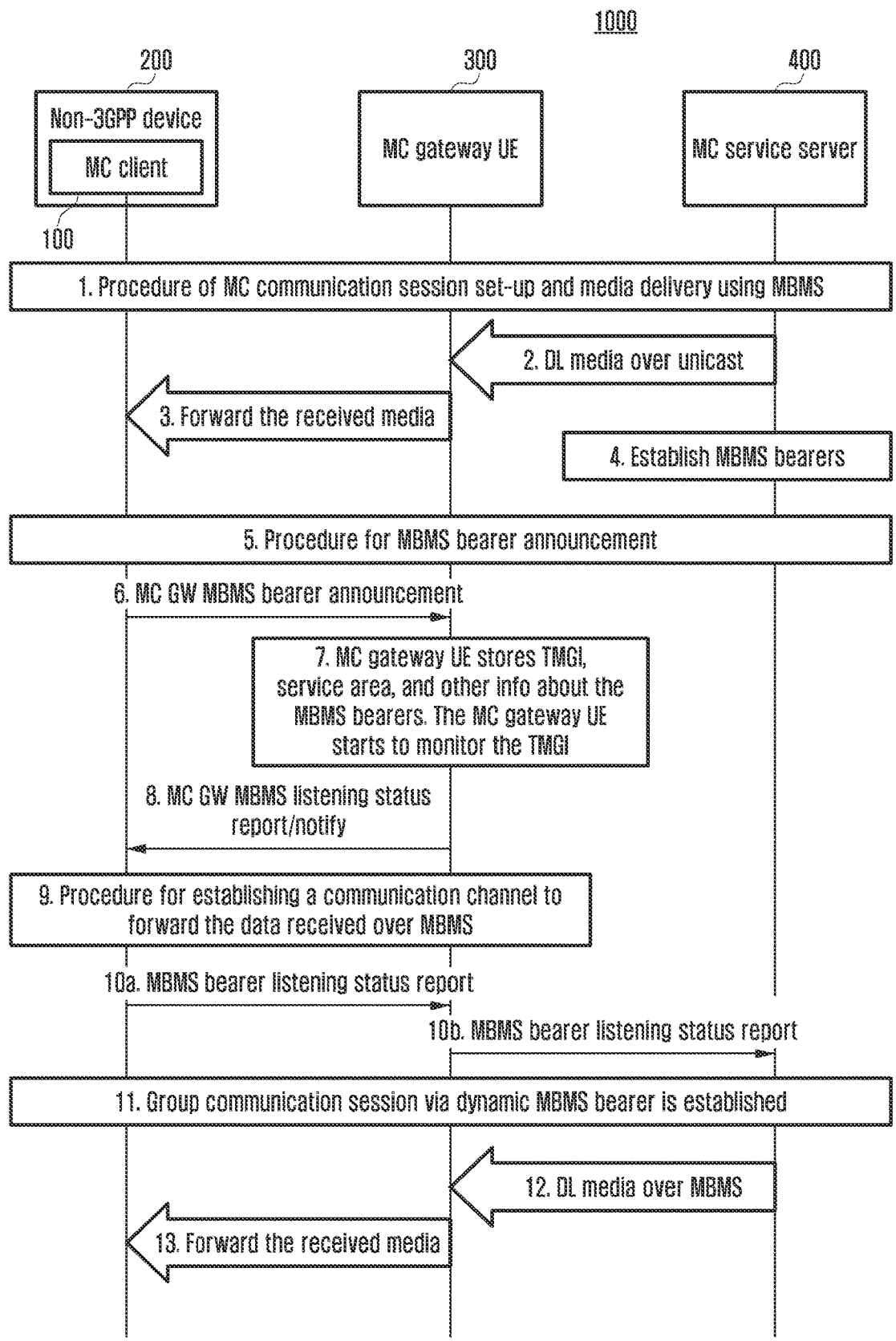

Use of Dynamic MBMS Bearer Establishment:

Dynamic MBMS bearer establishment procedure flows are same as the pre-established bearer announcement procedures but with the following difference: the MBMS bearer establishment is initiated before the start of the MC service communication set up or it is initiated after the MC service communication is set up. FIGS. 2A and 2B illustrate the mechanism of dynamic MBMS bearer establishments.

FIG. 2A illustrates the procedure of how an MC client requests an MC gateway UE to start listening on the MBMS bearer according to an embodiment of the disclosure. In this procedure, the MC client (100) starts monitoring the MBMS service areas based on the location information received from MC gateway UE (300).

Below are the pre-conditions for the procedures explained in the FIG. 2A.

The MC client (100) has been configured with the necessary parameters needed for connectivity with the MC gateway UE (300).

The MC client (100) has been receiving the 3GPP access network related location information from MC gateway UE (300).

Operation 1, the MC service group communication session is established.

Operation 2, the downlink data is sent by unicast delivery.

Operation 3, the MC gateway UE (300) forwards the MC service group communication data to the MC client (100).

Operation 4, the MC service server (400) establishes the MBMS bearer(s) for the group communication session according to the procedures defined in 3GPP TS 23.468. Service description associated with the MBMS bearer(s) is returned from the broadcast multimedia service center (BM-SC).

Operation 5, the MC service server (400) provides service description information associated with the MBMS bearer to the MC client (100) residing on the non 3GPP devices (200) via the MC gateway UE (300). The MC client (100) obtains the TMGI from the announcement message. This message may be sent on an application level control signaling bearer.

Operation 6, the MC client (100) stores the MBMS bearer related information and starts monitoring whether it is entering into any of MBMS service areas received in the MBMS bearer announcement.

Operation 7, the MC client (100) that enters or is in the service area of at least one announced TMGI, requests the MC gateway UE (300) to start listening on the MBMS bearer by sending MC GW MBMS listening request containing the details of the MBMS bearer.

Operation 8, the MC gateway UE (300) confirms the MC client (100) that it is able to listen on the MBMS bearer by sending the MC GW MBMS listening status report/notify. The MC GW MBMS listening status report also contains the details of the non 3GPP transport communication related parameters.

Operation 9, the MC client (100) establishes the communication channel with the MC gateway UE (300) based on the parameters received in operation 8 to receive the MC service data from the MC gateway UE (300). The MC gateway UE (300) forwards the MC service data it received over the MBMS bearer from the MC service server (400) to the MC client over the communication channel.

Operation 10, the MC client (100) sends the MBMS listening status report to the MC service server (400) indicating that it is able to receive the media over the MBMS, whereby the MC service server (400) may decide to use the MBMS bearer instead of unicast bearer for the MC communication sessions.

Operation 11, the MC service group communication session via dynamic MBMS bearer(s) is established.

Operation 12, as the MC service server (400) transmits the media over the MBMS bearer, the media packets are detected and delivered to the MC service client.

Operation 13, the MC gateway UE (300) forwards the received media to the MC client (100).

FIG. 2B illustrates the procedure of how an MC client shares the details of MBMS service announcement to an MC gateway UE according to an embodiment of the disclosure. In this procedure, the MC client (100) does not have to monitor the location information to detect whether it is entering into the MBMS service area or not. The MC gateway UE (300) monitors and starts listening on the MBMS bearer.

Below are the pre-conditions for the procedures explained in the FIG. 2B.

The MC client (100) has been configured with the necessary parameters needed for connectivity with the MC gateway UE (300).

Operation 1, the MC service group communication session is established.

Operation 2, the downlink data is sent by unicast delivery.

Operation 3, the MC gateway UE (300) forwards the MC service group communication data to the MC client (100).

Operation 4, the MC service server (400) establishes the MBMS bearer(s) for the group communication session according to the procedures defined in 3GPP TS 23.468. Service description associated with the MBMS bearer(s) is returned from the BM-SC.

Operation 5, the MC service server (400) provides the service description information associated with the MBMS bearer to the MC client (100) residing on the non 3GPP devices (200) via the MC gateway UE (300). The MC client (100) obtains the TMGI from the announcement message. This message may be sent on an application level control signaling bearer.

Operation 6, the MC client (100) sends the MC GW MBMS bearer announcement to the MC gateway UE (300) containing the MBMS bearer related information.

Operation 7, the MC gateway UE (300) stores the information associated with the TMGI(s). The MC gateway UE (300) uses the TMGI and other MBMS bearer related information to activate the monitoring of the MBMS bearer by the MC gateway UE (300).

Operation 8, the MC gateway UE (300) that enters or is in the service area of at least one announced TMGI notifies to the MC client (100) that it can receive media over MBMS by sending the MC GW MBMS listening status report/notify. The MC GW MBMS Listening Status Report also contains the details of the non 3GPP transport communication related parameters.

Operation 9, the MC client (100) establishes the communication channel with the MC gateway UE (300) based on the parameters received in operation 8 to receive the MC service data from the MC gateway UE (300). The MC gateway UE (300) forwards the MC service data it received over the MBMS bearer from the MC service server (400) to the MC client (100) over the communication channel.

Operation 10, the MC Client (100) sends the MBMS listening status report to the MC server indicating that it is able to receive the media over MBMS, whereby the MC service server (400) may decide to use the MBMS bearer instead of unicast bearer for MC communication sessions.

Operation 11, the MC service group communication session via dynamic MBMS bearer(s) is established.

Operation 12, as the MC service server (400) transmits the media over the MBMS bearer, the media packets are detected and delivered to the MC service client.

Operation 13, the MC gateway UE (300) forwards the received media to the MC client (100).

Handling of MBMS Bearer

The MC gateway UE (300) is the entity which has access to the 3GPP access network and can listen on the MBMS bearers on behalf of the MC clients (100) it is serving. These MC clients (100) can be either located in the MC gateway UE (300) or in the non 3GPP devices (200) connected to the MC gateway UE (300) via the non-3GPP access. When the MBMS bearer is used for MC communication, details of the MBMS bearer are sent to the MC clients (100). The MC gateway UE (300) is unaware of MBMS bearer details until it is shared by the MC Clients (100). The MC client (100) needs to share the MBMS bearer control messages to the MC gateway UE (300) to allow the MC gateway UE (300) to handle the MBMS transmission on behalf of MC clients (100). Following messages which are received from MC server by the MC clients' (100) needs to be shared with the MC gateway UE (300):

1. MBMS bearer announcement,
2. MBMS suspension reporting instruction,
3. MapGroupToBearer,
4. UnmapGroupFromBearer, and
5. Application Paging Information Flows for MBMS Transmission MC GW MBMS Bearer Announcement Table 1 describes the information flow from the MC client (100) to the MC gateway UE (300) for the MC GW MBMS bearer announcement.

TABLE 1

| Information element | Status | Description |
|---|---|---|
| MC GW service ID | Mandatory (M) | The GW MC service identifier (ID) of the requesting MC service user. |
| TMGI | M | TMGI information |
| List of service area identifier | M | A list of service area identifier for the applicable MBMS broadcast area. |
| Frequency | Optional (O) | Identification of frequency if multi carrier support is provided |
| Session Description Protocol (SDP) information | M | SDP with media and floor control information applicable to groups that can use the bearer (e.g. codec, protocol id, forward error correction (FEC) information) |
| Monitoring state | O | The monitoring state is used to control if the client is actively monitoring the MBMS bearer quality or not. |
| Robust Header Compression (ROHC) information | O | Indicate the usage of ROHC and provide the parameters of the ROHC channel to signal to the ROHC decoder. |

When MBMS bearer announcement is done on an MBMS bearer all attributes above are optional except the TMGI.

MC GW MBMS Listening Status Report/Notify

Table 2 describes the information flow from the MC gateway UE (300) to the MC Client (100) for the MC GW MBMS listening status report/notify.

TABLE 2

| Information element | Status | Description |
| --- | --- | --- |
| TMGI(s) | M | TMGI(s) information. |
| MBMS listening status(s) | M | The MBMS listening status per TMGI. |
| MBMS reception quality level | O | The reception quality level per TMGI |
| Non 3GPP transport channel establishment parameters | O | This elements contains the details of the non 3GPP channel establishment parameters (Internet protocol (IP) address, Port etc.,) which is used by the MC gateway UE to forward the MC service communication data received over 3GPP MBMS bearer to the MC client |

These parameters are implementation specific and are dependent on the non 3GPP transport mechanism used between the MC client and MC gateway UE. This parameter shall be present mandatorily if the MBMS bearer listening status is success.

MC GW MapGroupToBearer

Table 3 describes the information flow to associate an MC push to talk (MCPTT) group communication to an MBMS bearer. It is sent from the MC client (100) hosting MCPTT service to the MC gateway UE (300).

TABLE 3

| Information element | Status | Description |
| --- | --- | --- |
| MC GW service ID | M | The GW MC service ID of the MC service user. |
| MCPTT group ID | M | This element identifies the MCPTT group, in which the call is started. |
| Media stream identifier | M | This element identifies the media stream of the SDP used for the group call (e.g. MBMS subchannel). |
| TMGI | M | The MBMS bearer identifier. |

Table 4 describes the information flow to associate an MCVideo group communication to an MBMS bearer. It is sent from the MC client (100) hosting MCVideo service to the MC gateway UE (300).

TABLE 4

| Information element | Status | Description |
| --- | --- | --- |
| MC GW service ID | M | The GW MC service ID of the MC service user. |
| MCVideo group ID | M | This element identifies the MCVideo group, in which the call is started. |
| Media stream identifier (video) | M | This element identifies the media stream of the SDP used for the Video group call (e.g. MBMS subchannel). |
| Media stream identifier (audio) | O | This element identifies the audio media stream of the SDP used for the Video group call (e.g. MBMS subchannel). This is used if separate codecs are used for video and audio. |
| TMGI | M | The MBMS bearer identifier |

In general, the MC GW MapGroupToBearer contains all the information needed for the MC gateway UE (300) to identify the different the different group communications over the same MBMS bearer. Generically, Table 5 describes the information to be sent from MC client (100) to the MC gateway UE (300).

TABLE 5

| Information element | Status | Description |
| --- | --- | --- |
| MC GW service ID | M | The GW MC service ID of the MC service user. |
| MC Service group ID | M | This element identifies the MC service group, in which the MC group communication is started. |
| MBMS sub-channel details | M | This element contains the details of the MBMS sub channel to be used for the MC group communication. It includes media identifiers, port numbers and IP address etc., |
| TMGI | M | The MBMS bearer identifier |

MC GW MBMS Bearer Suspension Indication

Table 6 describes the information flow from the MC gateway UE (300) to the MC client (100) for the MC GW MBMS bearer suspension indication.

TABLE 6

| Information element | Status | Description |
| --- | --- | --- |
| TMGI(s) | M | TMGI(s) information. |
| MBMS suspension status(s) | M | The MBMS suspension status per TMGI. |

MC GW MapGroupToBearer Response

Table 7 describes the information flow from the MC gateway UE (300) to the MC client (100) for the MC GW MapGroupToBearer Response.

TABLE 7

| Information element | Status | Description |
| --- | --- | --- |
| MapGroupToBearer Status | M | Success or failure response |
| Non 3GPP transport channel establishment parameters | M | This elements contains the details of the non 3GPP channel establishment parameters (IP address, Port etc.,) which is used by the MC gateway UE to forward the MC service Group communication data received over 3GPP MBMS bearer to the MC client |

These parameters are implementation specific and are dependent on the non 3GPP transport mechanism used between the MC client and MC gateway UE MC GW MBMS Bearer Listening Request Table 8 describes the information flow from the MC client (100) to the MC gateway UE (300) for the MC GW MBMS bearer Listening Request.

TABLE 8

| Information element | Status | Description |
| --- | --- | --- |
| TMGI | M | TMGI information |
| List of service area identifier | M | A list of service area identifier for the applicable MBMS broadcast area. |
| Frequency | O | Identification of frequency if multi carrier support is provided |
| SDP information | M | SDP with media and floor control information applicable to groups that can use this bearer (e.g. codec, protocol id, FEC information) |
| ROHC information | O | Indicate the usage of ROHC and provide the parameters of the ROHC channel to signal to the ROHC decoder. |

MC GW MBMS Bearer Quality Report

Table 9 describes the information flow from the MC gateway UE (300) to the MC client (100) for the MC GW MBMS bearer quality report.

TABLE 9

| Information element | Status | Description |
| --- | --- | --- |
| TMGI(s) | M | TMGI(s) information. |
| MBMS listening status(s) | M | The MBMS listening status per TMGI. |
| MBMS reception quality level | O | The reception quality level per TMGI |

Use of MBMS Bearer for Application Level Control Messages

The MC service server (400) may use an MBMS bearer for application level control signaling, according to this subclause. An MBMS bearer for application level control signaling is typically used for the purposes beyond the benefit for using MBMS for resource efficiency, e.g., for improved MC service performance (KPIs), handling of high load scenarios.

The MBMS bearer for application level control signaling may be used to transmit the following messages:
a. Transmission control (e.g., call setup and floor control),
b. Group application paging,
c. Group dynamic data (e.g., status of the group), and
d. Group state (e.g., emergency alerts)

The MBMS bearer for application level control signaling is activated in a service area that is larger than the estimated service for media bearers. The service area for the media bearers mainly based on counting of group members in each defined service area. The MBMS bearer for application level control signaling is also activated with a quality of service (QoS) that is better than MBMS media bearers since the packet loss requirements are much stricter.

The MC client (100) shall not send responses to group-addressed application level control signaling unless instructed or configured to respond.

The procedure depicted in FIG. 3 shows only one of the receiving MC service clients using an MBMS bearer.

Below are the pre-conditions for the procedures explained in the FIG. 3.

The MC client (100) has been configured with the necessary parameters needed for connectivity with the MC gateway UE (300).

The MC client (100) successfully completed service authorization via MC gateway UE (300).

The MC client (100) shared the MBMS bearer details to the MC gateway UE (300) and the MC gateway UE (300) started listening on the MBMS bearer.

Operation 1, the MC gateway UE (300) that enters or is in the service area of at least one announced TMGI and starts listening on the MBMS bearer.

Operation 2, the MC gateway UE (300) notifies the MC client (100) that it can receive data over MBMS by sending the MC GW MBMS Listening Status Report/Notify. The MC GW MBMS Listening Status Report also contains the details of the non 3GPP transport communication related parameters.

Operation 3, the MC client (100) sends the MBMS listening status report to the MC service server (400) indicating that it is able to receive the application level control messages over MBMS, whereby the MC service server (400) may decide to use the MBMS bearer instead of unicast bearer for MC communication sessions.

Operation 4, the MC client (100) establishes the communication channel with the MC gateway UE (300) based on the parameters received in operation 3 to receive the MC service data from the MC gateway UE (300). The MC gateway UE (300) forwards the MC service data it received over the MBMS bearer from the MC service server (400) to the MC client (100) over the communication channel.

Operation 5, the MC service server (400) transmit MC application control messages.

Operation 6, the MC gateway forwards the MC application control messages to the MC client (100) over the communication channel as established in operation 4.

The above procedures of updating the MC gateway UE (300) with the MBMS bearer related information by sending the MC GW MBMS bearer announcement applies whenever the MC clients (100) receive the MBMS bearer announcement either over the multicast channel or over the unicast channel from the MC system or MC service server (400).

Communication Channel Between MC Client and MC Gateway UE (300):

Between the MC client (100) and the MC gateway UE (300), the communication mechanism could be Unicast, multicast or broadcast. Embodiments herein propose that the MC client (100) should be conveyed whether the data traffic is received over unicast or multicast by the MC gateway UE (300). If the MC gateway UE (300) uses the multicast channel on the non 3GPP transport to forward the data traffic received over MBMS channel on the 3GPP transport, then it is implicitly known to the MC client (100) that this data traffic is received over MBMS channel and it can handle the data traffic accordingly. If there is no possibility of using multicast channel between the MC gateway UE (300) and the MC client (100), then there is a need to differentiate the data traffic, so that MC client (100) knows that it is received over the MBMS channel on the 3GPP transport and knows how to handle the data traffic. In case of where there is no multicast channel between the MC client (100) and the MC gateway UE (300). Embodiments herein propose that there should be a separate channel between MC client (100) and MC gateway UE (300) for delivering the data received by the MC gateway UE (300) over the unicast bearer and a different channel to deliver the data received by MC gateway over multicast bearer. The channel between the MC gateway UE (300) and MC client (100) for delivering the multicast data can either be unicast or multicast based on the non-3GPP transport being used for communication between MC client (100) and MC gateway UE (300). Since the MBMS traffic may be encrypted, having a different channel to send the MBMS traffic to the MC clients (100) will help in applying the appropriate encryption keys to decrypt the packets.

Figure 4:
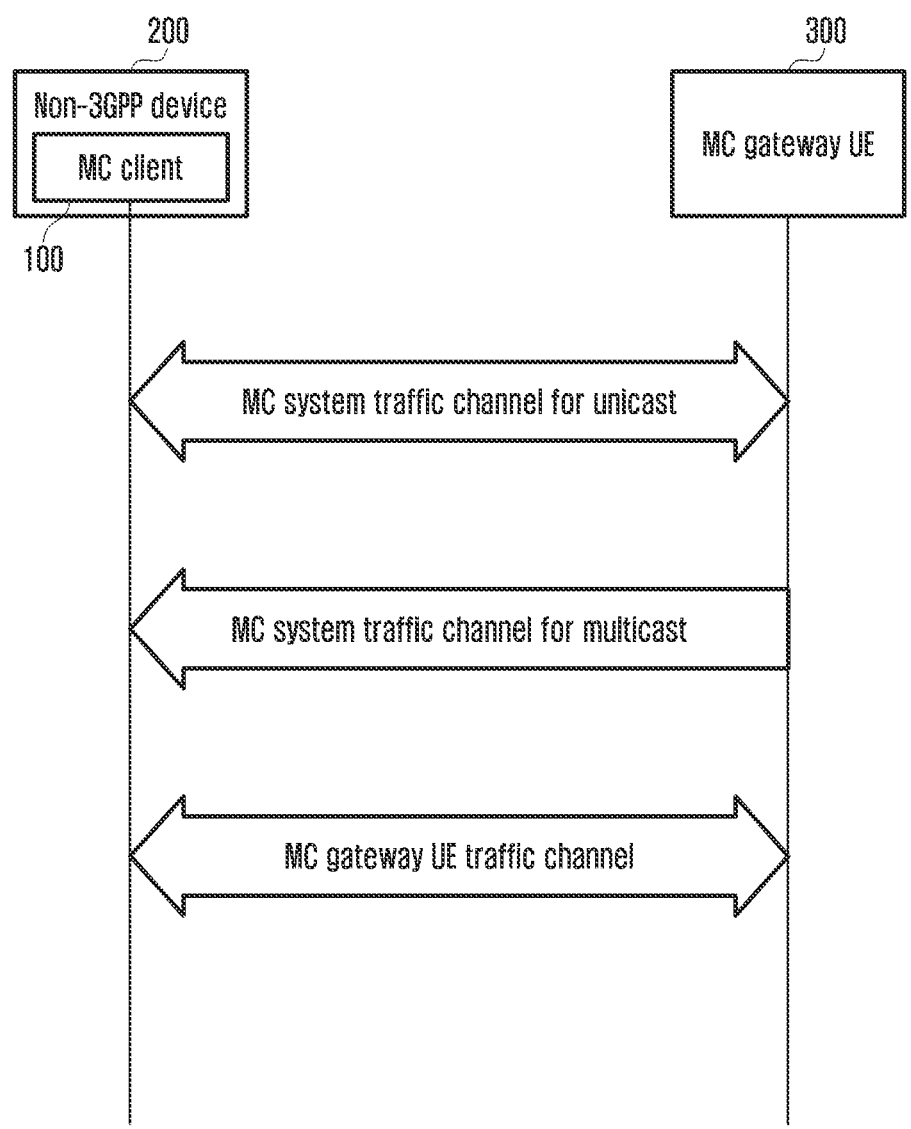
FIG. 4 depicts a scenario, wherein at least three channels (socket communication) are established between the MC client and the MC gateway UE for handling the data traffic, according to an embodiment of the disclosure.

Embodiments herein foresee at least 3 channels (socket communication) to be established between MC client (100) and MC gateway UE (300) for handling the data traffic, which is depicted in FIG. 4 and details are as below:

Operation 1, the MC system traffic channel for the unicast: This channel will be used for uplink and downlink traffic between the MC client (100) and the MC system which the MC gateway UE (300) just forwards as received without acting on it.

Operation 2, the MC gateway traffic channel (Unicast): This channel will be used for uplink and downlink data between the MC client (100) and the MC gateway UE (300). Communication messages received over this channel by the MC gateway UE (300) will not be forwarded to the MC system and instead MC gateway handles the message by itself. The information flows like MC GW MBMS bearer announcement, MC GW MapGroupToBearer, MC GW MBMS listening status report/notify etc. can be exchanged over this channel.

Operation 3, the MC system traffic channel for multicast: The MC gateway UE (300) will be listening on the MBMS bearer and forwards the data received over MBMS bearer to the MC clients (100) it is serving. Since the encryption technique used for the MBMS traffic is different from the unicast traffic, the MC clients (100) can apply the appropriate security parameters to decrypt the packets received over this channel. This channel can either be unicast or multicast based on the non-3GPP transport being used. It carries the downlink traffic received by the MC gateway UE (300) over MBMS channel.

Handling of MapGroupToBearer Messages:

When the MC client (100) detects that the data received from MC service server (400) is MapGroupToBearer message and if the MC client (100) participates in the group session or communication identified by the MapGroupToBearer message then it should inform the details contained in the MapGroupToBearer message to the MC gateway UE (300) by sending MC GW MapGroupToBearer. When the association of group call, the MBMS bearer and the MC GW service ID of the MC client (100) is known to the MC gateway UE (300), it can forward the data received over MBMS bearer accordingly. The MC gateway UE (300) shall maintain the list of the MC clients (100) that sent the MC GW MapGroupToBearer message and forward the data received over the MBMS subchannel identified by the MC GW MapGroupToBearer message only to those MC clients (100).

Figure 5:
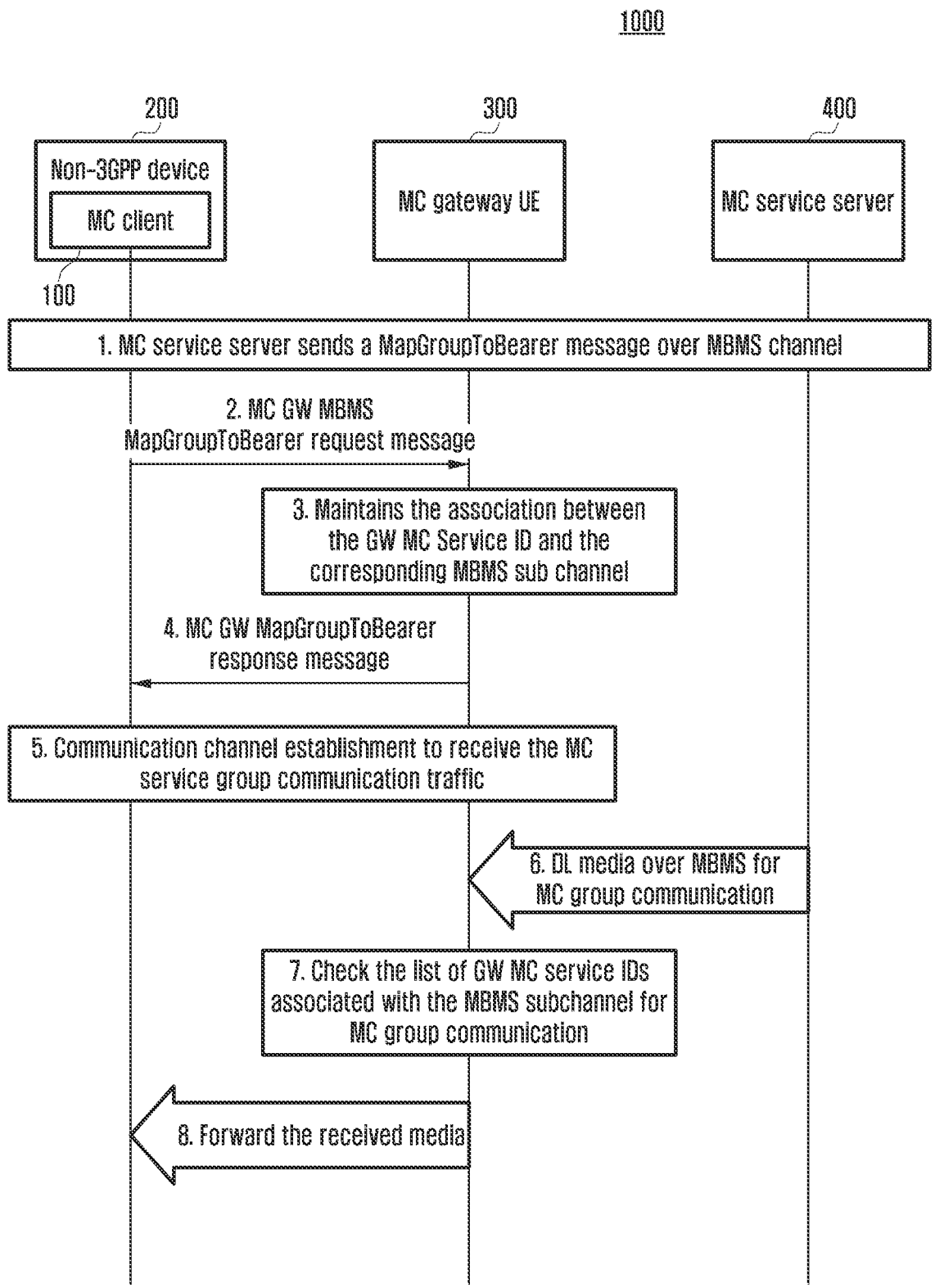
FIG. 5 depicts the procedure of handling MapGroupTo-Bearer messages, according to an embodiment of the disclosure.

FIG. 5 describes this procedure and the detailed operations are as below according to an embodiment of the disclosure.

Below are the pre-conditions for the procedures explained in the FIG. 5.

The MC client (100) shares the details of the MBMS bearer announcement with the MC gateway UE (300).

The MBMS bearer is activated and the MC gateway UE (300) starts listening the MBMS bearer.

The MC group communication is initiated and the MC service server (400) decides to use the MBMS bearer for call.

Operation 1, the MC service server (400) will send a MapGroupToBearer message over a previously activated MBMS bearer to all users that will receive the call over an MBMS bearer. The MapGroupToBearer message includes association information between the group call and MBMS bearer. The MapGroupToBearer message includes MC service group ID and information about the media stream identifier of the activated MBMS bearer and may include the identifier (i.e., the TMGI) of the MBMS bearer broadcasting the call.

Operation 2, if the MC client (100) is participating in the MC group communication identified by the MapGroupToBearer message, it sends the details contained in the MapGroupToBearer message to the MC gateway UE (300) through MC GW MapGroupToBearer request message.

Operation 3, the MC gateway on receiving the MC GW MapGroupToBearer request message from the MC client (100), it maintains the association between the GW MC Service ID and the corresponding MBMS sub channel.

Operation 4, the MC gateway UE (300) sends the MC GW MapGroupToBearer response message to the MC client (100), which contains the details of the non 3GPP transport communication related parameters.

Operation 5, the MC client (100) establishes the communication channel with the MC gateway UE (300) based on the parameters received in operation 4 to receive the MC service group communication data from the MC gateway UE (300).

Operation 6, the MC service server (400) sends the downlink media for the group communication session over the MBMS bearer.

Operation 7, the MC gateway UE (300) checks which MC clients (100) should receive the media of the MC group communication based on Operation 3.

Operation 8, the MC gateway UE (300) forwards the downlink media to the intended MC clients (100) over the communication channel established as in operation 5.

For operation 8, the MC gateway UE (300) shall use the dedicated channel established between the MC client (100) and the MC gateway UE (300) for sending the multicast traffic. This channel could be either multicast or unicast and is left to the implementation technology of transport channel between the MC clients (100) and the MC gateway UE (300).

MBMS Bearer Suspension Notification

The MC service server (400) can choose to instruct some MC clients (100) to send the MBMS bearer suspension report when notified by the radio access network (RAN) (500). When the MC clients (100) are residing on the non 3GPP devices (200), the MC gateway UE (300) would be the one listening on the MBMS bearers. When the RAN (500) decides to suspend the MBMS bearer it indicates the MC gateway UE (300). The MC gateway UE (300) in turn has to notify the MC clients (100) it is serving, so that the MC clients (100) can report the same to the MC service server (400). This procedure is applicable only if the MC client (100) is instructed to report the MBMS bearer suspension. Irrespective of whether the MC clients (100) need to send the MBMS bearer suspension report to the MC service server (400), the MC gateway can choose to notify the MC clients (100) it is serving, whenever the RAN (500) suspends the MBMS bearer. The MC clients (100) can then decide to send the MBMS bearer suspension report to the MC service server (400) only, if they are instructed by the MC service server (400).

Figure 6:
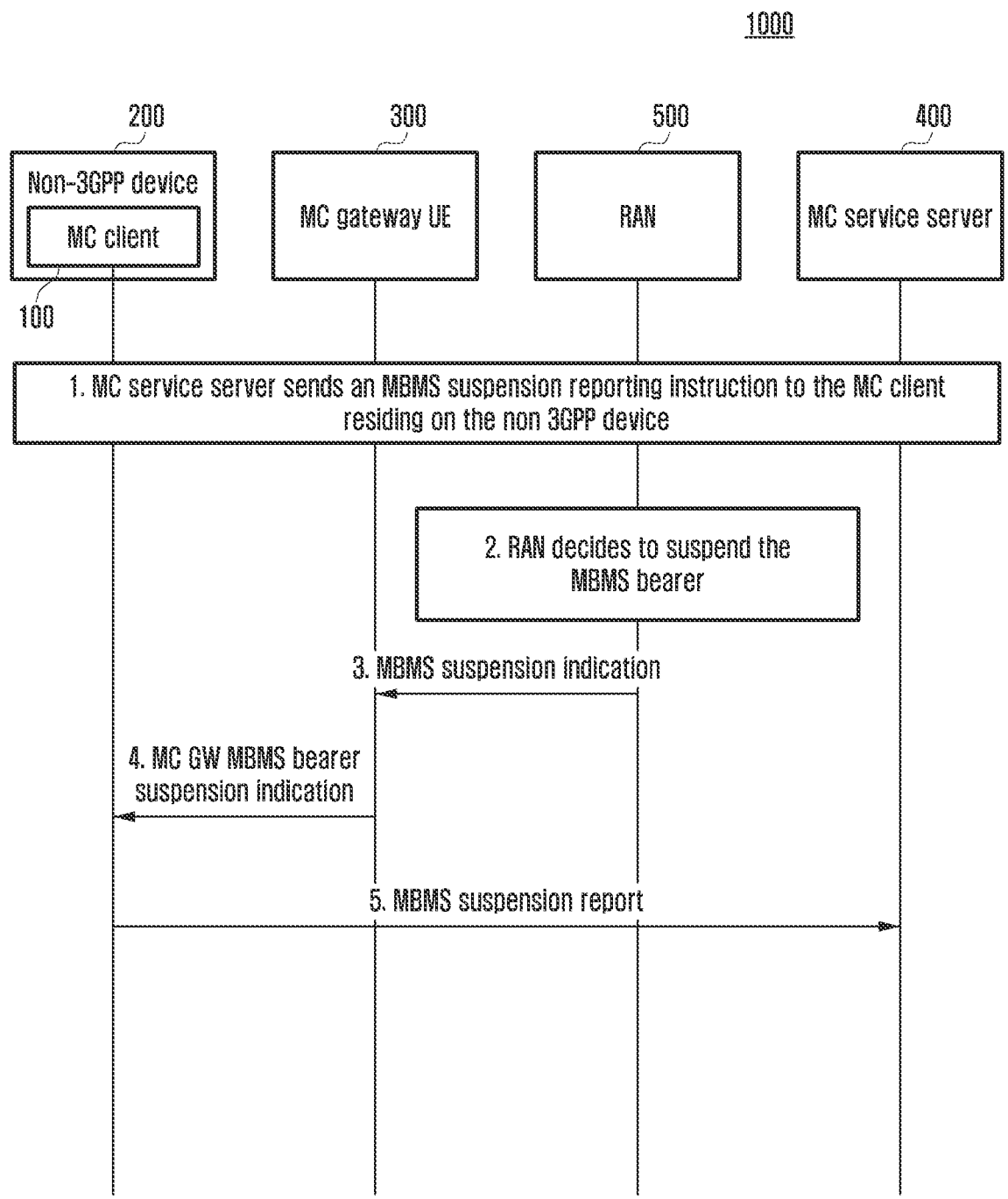
FIG. 6 describes the procedure for how MC clients reports the MBMS bearer suspension to an MC server, according to an embodiment of the disclosure.

FIG. 6 describes the procedure for how MC clients report the MBMS bearer suspension to an MC service server according to an embodiment of the disclosure. In this procedure, the MC client (100) is requested by the MC service server (400) to send an MBMS suspension report. This request for MBMS suspension report can be included in the MBMS bearer announcement and the MC service server (400) may choose to only send this request for MBMS suspension report to a subset of MC clients (100).

Below are the pre-conditions for the procedures explained in the FIG. 6.

It is assumed that there is at least one active MBMS bearer.

Operation 1, the MC service server (400) sends an MBMS suspension reporting instruction to the MC client (100) residing on the non 3GPP device (200). This message may be included in the MBMS bearer announcement message and may be sent both on a unicast bearer and a multicast bearer.

Operation 2, the RAN (500) decides to suspend the MBMS bearer, according to existing procedures in 3GPP TS 36.300.

Operation 3, an MBMS suspension indication is sent to the MC gateway UE (300) in the multicast channel (MCH) Scheduling Information (MSI), according to existing procedures in 3GPP TS 36.300.

Operation 4, the MC gateway UE (300) detect the MBMS suspension and sends an MC GW MBMS suspension indication to the MC client (100) residing on the non 3GPP device (200).

Operation 5, the MC client MBMS suspension report to the MC Service server (400) via the MC gateway UE (300).

The MC service client that is not instructed to send an MBMS suspension report shall detect the MBMS suspension indication from the RAN (500) (operation 4). An MC service client shall in this case not send other types of report (e.g., MBMS listening reports).

The same procedure can be applied at MBMS resumption or other MBMS events that may be detected by the MC gateway UE (300).

MBMS Bearer Quality Detection

Since the MC gateway UE (300) is listening on the MBMS bearer on behalf of the MC clients (100), it has to report the MBMS bearer quality to the MC clients (100), so that the MC clients (100) can report the same to the MC service server (400). The MC gateway UE (300) monitors the MBMS bearer to receive MC service media. Based on the received quality (e.g., radio level quality, transport level quality), the MC gateway UE (300) needs to inform the MC clients (100) which asked the MC gateway UE (300) to listen on MBMS bearer, that the MC gateway UE (300) is able to receive the MC service media on the MBMS bearer with sufficient quality or not able to receive the MC service media on the MBMS bearer with sufficient quality so that the MC clients (100) can inform the MC Service server (400) accordingly. Furthermore, based on the received quality, the MC gateway UE (300) may notify the MC clients (100) at which MBMS reception quality level it has received the MC service media on the MBMS bearer.

The issue can be more complex since the MC gateway UE (300) needs to estimate the quality of the bearer even in the scenario when there are no data currently transmitted on the MBMS bearer (e.g., between MCPTT group call). The reason for this is that an MC gateway UE (300) that has entered an area with significantly degraded MBMS quality, might not even notice that an MC service communication is ongoing, meanwhile the MC server assumes that the MC service client can receive the media being broadcasted.

In order to estimate the MBMS bearer quality, for example as an equivalent BLER (Block Error Rate), when no data is sent is implementation specific. This estimation can be dependent on for example the modulation and coding scheme (MCS) and measurements from the reference signals from the eNB(s). Other metrics (e.g., real-time transport protocol (RTP) packet loss) may be used to estimate the MBMS bearer quality.

Figure 7:
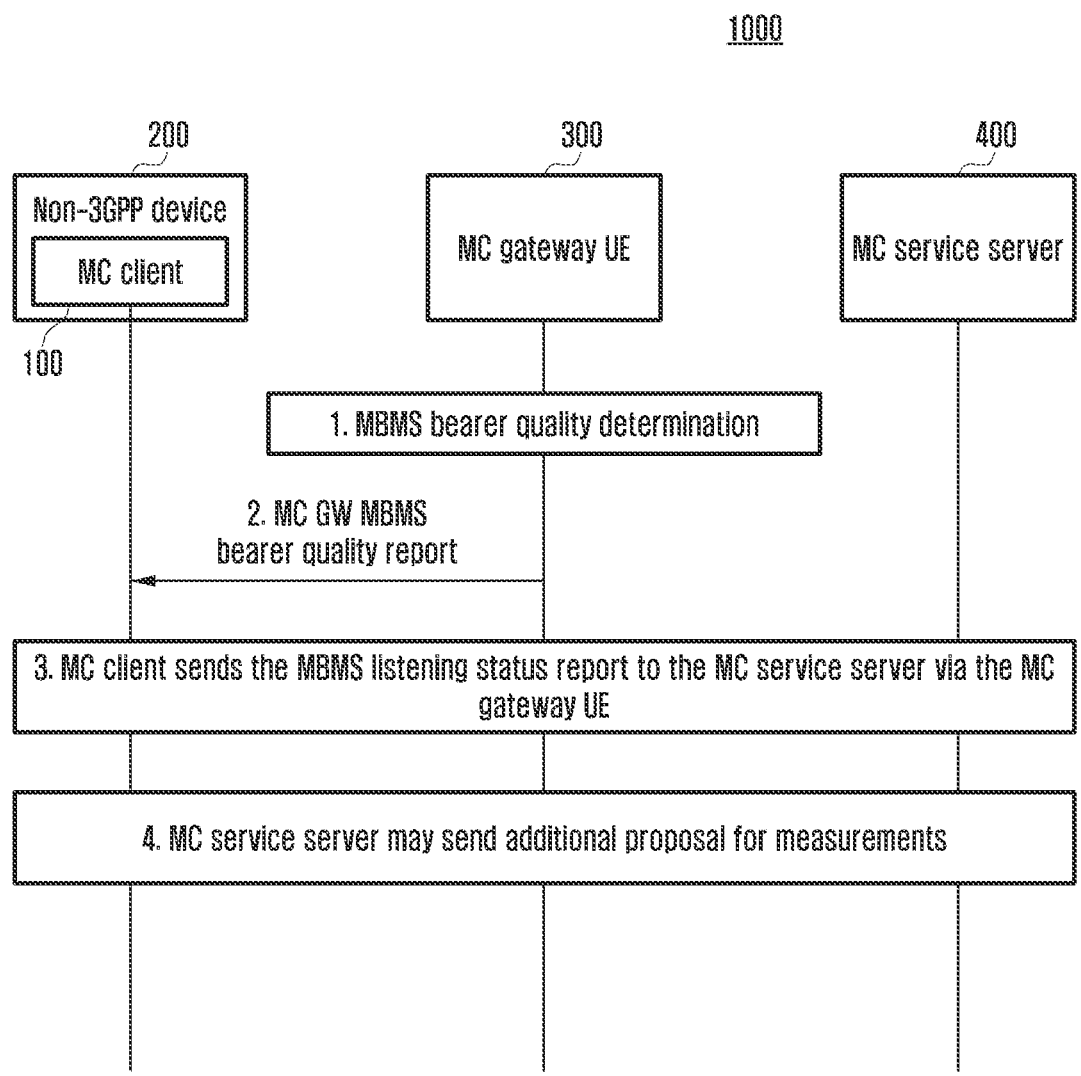
FIG. 7 depicts a procedure of detecting MBMS bearer quality, according to an embodiment of the disclosure.

FIG. 7 depicts a procedure of detecting MBMS bearer quality, according to an embodiment of the disclosure.

Procedures

Referring to FIG. 7, embodiments herein propose that an MC gateway UE (300) follows the procedure as described in 3GPP TS 23.280 Section 10.7.3.6 to determine the MBMS bearer quality. MC gateway UE (300) informs the MC client (100) about the MBMS bearer quality and the MC client informs the same to the MC service server (400). FIG. 7 describes this procedure.

For the sake of brevity, only one MC client (100) is shown in the procedure but there could be more than one MC clients which has requested the MC gateway UE (300) to listen on a particular MBMS bearer.

Below are the pre-conditions for the procedures explained in the FIG. 7.

There is an MBMS bearer activated and the MBMS bearer information is announced to the MC gateway UE (300).

The MC gateway UE (300) is located in the MBMS broadcasting area.

The MC gateway UE (300) monitors SIB-13 (or SIB-20) and (SC-) MCCH to receive the modulation and coding scheme.

The MC gateway UE (300) monitors the cell specific reference signal and when MBSFN transmission is used, the MBSFN specific reference signals.

Operation 1, here the MC gateway UE (300) follows the Operation 1 of the procedure as described in 3GPP TS 23.280 Section 10.7.3.6.2 for the MC service UE. Instead of reporting the bearer quality to the MC service server (400), it has to inform all the MC clients (100) which has asked the MC gateway UE (300) to listen on the particular MBMS bearer.

Operation 2, if the MBMS bearer quality reaches a certain threshold, the MC gateway UE (300) sends the MC GW MBMS bearer quality report to the MC client (100). The threshold is used to define the MBMS listening status, which indicates if the MBMS bearer quality has been acceptable or not to receive a specific MC service media. If the MBMS bearer quality is mapped to a different MBMS reception quality level, the MC gateway UE (300) may send an MBMS Bearer Quality report including the MBMS reception quality level to the MC client (100).

Operation 3, the MC client (100) sends the MBMS listening status report to the MC service server (400) via the MC gateway UE (300) containing the information received in the MC GW MBMS bearer quality report.

Operation 4, the MC service server (400) may send additional proposal for measurements; e.g., information about neighboring MBMS bearers. This message may be an MBMS bearer announcement message.

Approach 2:

The MC system sends the MBMS bearer announcements and updates to the MC gateway UE (300) directly. This approach requires that MC gateway UE (300) to be addressable by the MC system. For this approach, embodiments herein assume that MC gateway UE (300) is addressable by the MC service server (400) and the MC gateway UE (300) needs to support and handle the following information flows which are defined in TS 23.280.

In order to support the usage of MBMS bearer for the MC clients (100) residing on the non 3GPP devices (200), the MC gateway UE (300) needs to support the procedures and information flows applicable for MC service UE as defined in clause 10.7 of TS 23.380 with the following clarifications:

The MC gateway UE (300) needs to be assigned with the MC service ID and configured with minimal information required for it to be authenticated and authorized with MC system for supporting MBMS bearer usage.

The MC service server (400) shall be able to address the MC gateway UE (300) using the MC service ID for exchanging the requests and responses related to the MBMS bearer usage.

The MC service server (400) shall maintain the list of MC gateway UEs (300) and per MC gateway UE (300), the list of MC clients (100) resides on the non 3GPP devices (200) and accesses the MC system via the MC gateway UE (300).

The MC service server (400) can choose to send the information related to MBMS bearer announcements, updates to the MBMS bearer announcements, suspension of MBMS bearer, mapping of MC service group communication with MBMS bearer etc. to the MC gateway UE (300) instead of sending to the individual MC clients (100) (residing on the non 3GPP devices (200)) which are accessing the MC system via this MC gateway UE (300). The MC service server (400) shall always send this information to the MC gateway UE (300) over the unicast channel, so that the MC gateway UE (300) need not process the data received over MBMS bearer. It just forwards the data received over the MBMS bearer to the MC clients (100) it is serving. Also, the MC gateway UE (300) does not have to configured with the security keys for decrypting the data received over MBMS bearer.

The MC service server (400) on receiving the MBMS bearer suspension report from the MC gateway UE (300), the MC service server (400) considers it as if it is received from all the MC clients (100) residing on the non 3GPP devices (200) and accessing the MC system through the MC gateway UE (300) for any decision making purpose.

The MC clients (100) shall ignore the MBMS bearer announcements, MBMS bearer updates, and MapGroupToBearer messages, which are received over the MBMS bearer since these messages are to be handled by the MC gateway UE (300).

Applicable Information Flows

The MBMS bearer announcement (as defined in 10.7.2.1 of TS 23.280), which is currently being sent from the MC service server (400) to the MC service client (199) needs to be sent to the MC gateway UE (300).

The MBMS listening status report (as defined in 10.7.2.2 of TS 23.280) has to be sent by the MC gateway UE (300) to the MC service server (400).

The MBMS suspension reporting instruction (as defined in 10.7.2.3 of TS 23.280) has to be sent from MC service server (400) to the MC gateway UE (300) over unicast bearer.

The MapGroupToBearer message as defined in TS 23.379 for MCPTT and in TS 23.281 for MCVideo shall be sent from MC service server (400) to the MC gateway UE (300). This needs to be sent to the MC gateway UE (300) over the unicast bearer.

The MC Service server (400) shall maintain the mapping of MC gateway UE (300) and the list of the MC clients (100) being served by the MC gateway UE (300). Whenever MC service server (400) has to establish, update or suspend the MBMS bearer, it can send the corresponding messages to the MC gateway UE (300). When the MC gateway UE (300) sends the MBMS listening status report to the MC service server (400), the MC service server (400) shall consider this message as received from all the MC clients (100) that the MC gateway UE (300) is serving for any decision making purpose.

Whenever the MC service server (400) has to establish, update or suspend the MBMS bearer, it can choose to send that information only to the MC gateway UE (300) instead of sending it to the individual MC clients (100), which are residing on the non 3GPP devices (200) and accessing the MC system via this MC gateway UE (300).

Use of Pre-Established MBMS Bearers

In this scenario, the MC service server (400) pre-establishes MBMS bearer(s) in certain pre-configured areas before the initiation of the group communication session. When the user originates a request for a group communication session for one of these areas, the pre-established MBMS bearer(s) is used for the DL media transmission.

The following operations need to be performed prior the start of the MC group communication session over pre-established MBMS bearer involving the MC clients (100) residing on the non 3GPP devices (200) and accessing the MC services via the MC gateway UE (300):

a. MBMS bearer(s) is pre-established.

b. Announce the pre-established MBMS bearer to the MC service clients and MC gateway UE (300).

When these preparation operations have been done the MC group communication session using MBMS bearer can start. Both the media packets as well as the application level control signaling (e.g., floor control messages) to the receiving MC service clients are sent on the MBMS bearer. Optionally, a separate MBMS bearer could be used for the application level control messages, due to different bearer characteristic requirements.

Figure 8:
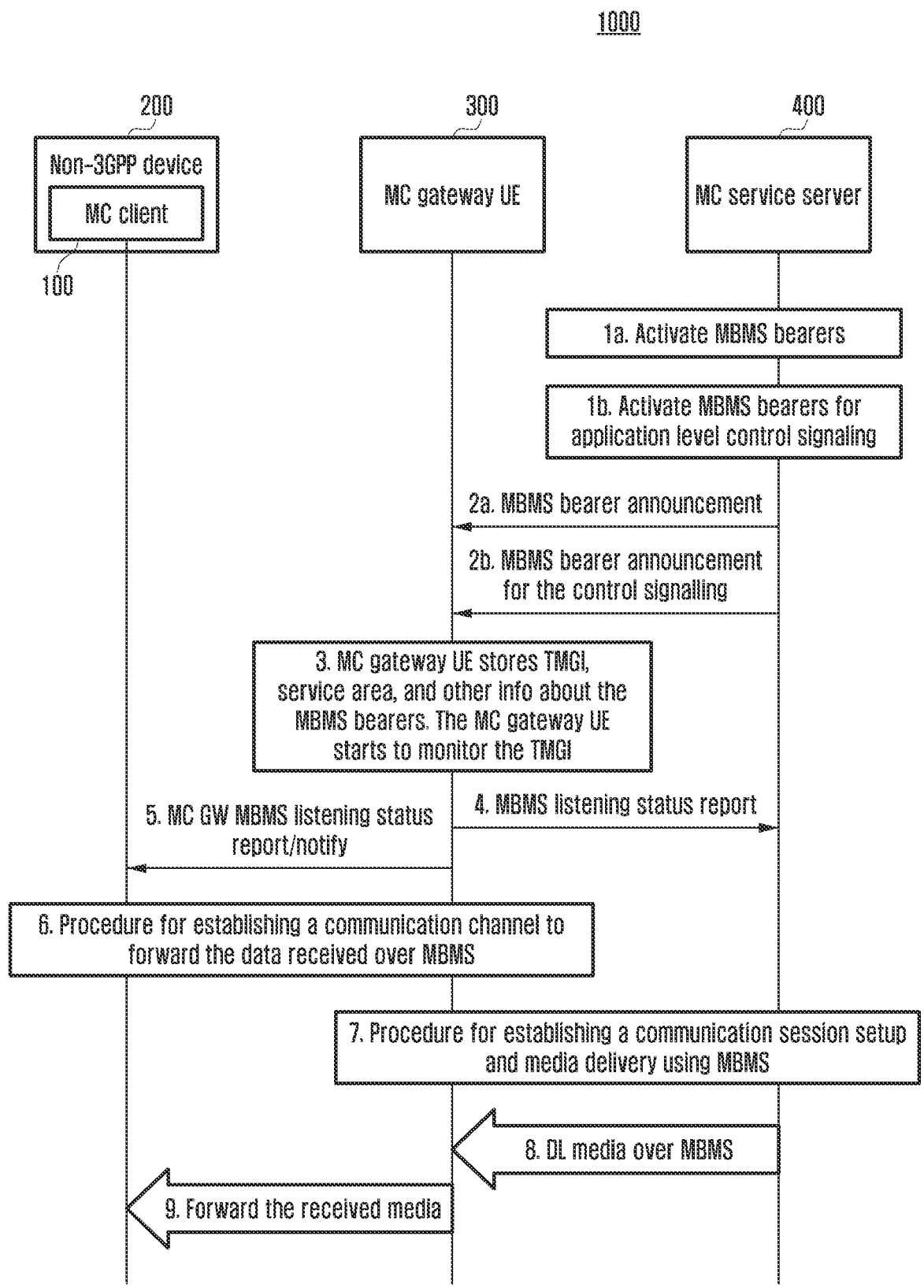
FIG. 8 depicts a scenario wherein only one of a receiving MC client residing on non 3GPP device and MC gateway UE using an MBMS bearer, according to an embodiment of the disclosure.

FIG. 8 depicts a scenario wherein only one of a receiving MC client residing on non 3GPP device and MC gateway UE using an MBMS bearer, according to an embodiment of the disclosure.

Referring to FIG. 8, the procedure, depicted in FIG. 8, shows only one of a receiving MC client (100) residing on a non 3GPP device (200) and an MC gateway UE (300) using an MBMS bearer. There might also be MC service clients in the same MC group communication session that receive the communication on unicast bearers.

Below are the pre-conditions for the procedures explained in the FIG. 8.

The MC Gateway completed the required authentication and authorization with the MC system so that it is addressable directly by the MC service server (400).

The MC service server (400) maintains the list of MC gateway UEs (300) and the list of MC clients (100) residing on the non 3GPP devices (200), which accesses the MC system via the MC gateway UE (300).

The participating users are already affiliated.

Operation 1a, the MC service server (400) determines to activate MBMS bearer. The activation of the MBMS bearer is done on the MB2-C reference point and according to 3GPP TS 23.468. This bearer will be used for the MC communication media.

Operation 1b, optionally, the MC service server (400) may also activate an MBMS bearer dedicated for application level control signaling. The activation of the MBMS bearer is done on MB2-C reference point and according to 3GPP TS 23.468.

The procedure to determine the activation of MBMS bearers is implementation specific.

Operation 2a, the MC service server (400) passes the MBMS bearer info for the service description associated with the pre-established MBMS bearer to the MC gateway UE (300). The MC gateway UE (300) obtains the TMGI, identifying the MBMS bearer, from the service description.

Operation 2b, the MC service server (400) may pass the MBMS bearer info for the service description associated with the pre-established floor control MBMS bearer to the MC gateway UE (300). The MC gateway UE (300) obtains the TMGI, identifying the MBMS bearer, from the service description.

Operations 2a and 2b can be done in one MBMS bearer announcement message. The MC service server (400) can choose to send the MBMS bearer announcement only to the MC gateway UE (300) instead of sending to all the MC clients (100) it is serving or to both the MC gateway UE (300) and the MC clients (100) residing on the non 3GPP devices (200) and accessing the MC system through the MC gateway UE (300).

Operation 3, the MC gateway UE (300) stores the information associated with the TMGI(s). The MC gateway UE (300) uses the TMGI and other MBMS bearer related information to activate the monitoring of the MBMS bearer by the MC gateway UE (300).

Operation 4, the MC gateway UE (300) that enters or is in the service area of at least one announced TMGI indicates to the MC service server (400) that the MC gateway UE (300) is able to receive media over MBMS, whereby the MC service server (400) may decide to use the MBMS bearer instead of unicast bearer for MC communication sessions. MC service server (400) shall treat the MBMS listening status report received from the MC gateway UE (300) as if it is received from all the MC clients (100) residing on the non 3GPP devices (200) and accessing the MC system through this MC gateway UE (300).

Operation 4 is optional for the MC gateway UE (300) on subsequent MBMS bearer announcements.

Operation 5, the MC gateway UE (300) confirms the MC client (100) that it is able to listen on the MBMS bearer by sending the MC GW MBMS Listening Status Report/Notify. The MC GW MBMS listening status report also contains the details of the non 3GPP transport communication related parameters.

Operation 6, the MC client (100) establishes the communication channel with the MC gateway UE (300) based on the parameters received in operation 5 to receive the MC service data from the MC gateway UE (300). This allows MC gateway UE (300) to forward the MC service data it received over the MBMS bearer from the MC service server (400) to the MC client (100) over this communication channel.

Operation 7, the MC service group communication session is established.

Operation 8, as the MC service server (400) transmits the media over the MBMS bearer, the media packets are detected and delivered to the MC gateway UE (300).

Operation 9, the MC gateway UE (300) then forwards the received data to the MC clients (100) residing on the non 3GPP devices (200) over the communication channel established in Operation 6.

Use of Dynamic MBMS Bearer Establishment

Figure 9:
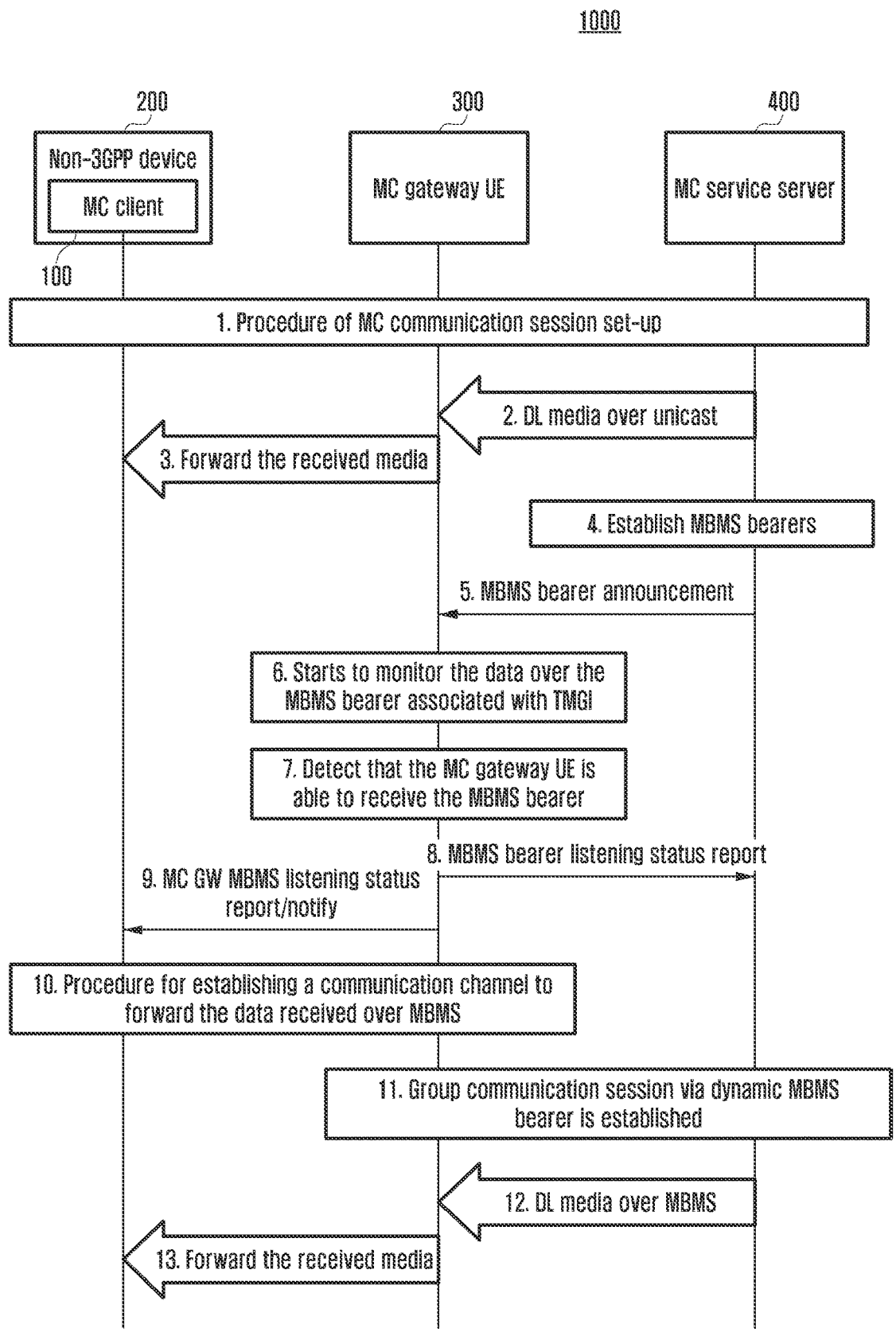
FIG. 9 depicts a scenario in which the MC service server uses a unicast bearer for communication with the UE on a downlink (DL) at a start of a group communication session, according to an embodiment of the disclosure.

FIG. 9 depicts a scenario in which the MC service server uses a unicast bearer for communication with the UE on a DL at a start of a group communication session, according to an embodiment of the disclosure.

Referring to FIG. 9, in this scenario depicted in FIG. 9, an MC service server (400) uses a unicast bearer for communication with a UE on a DL at a start of a group communication session. When the MC service server (400) decides to use an MBMS bearer for the DL media transmission, the MC service server (400) establishes an MBMS bearer using the procedures defined in 3GPP TS 23.468. The MC service server (400) provides the MBMS service description information associated with MBMS bearer(s), obtained from the BM-SC, to the MC gateway UE (300). The MC gateway UE (300) starts using the MBMS bearer(s) to receive DL media.

Below are the pre-conditions for the procedures explained in the FIG. 9.

The MC gateway completed the required authentication and authorization with the MC system so that it is addressable directly by the MC service server (400).

The MC service server (400) maintains the list of MC gateway UEs (300) and the list of MC clients (100) residing on the non 3GPP devices (200) which accesses the MC system via the MC gateway UE (300).

The participating users are already affiliated.

Operation 1, the MC service group communication session is established.

Operation 2, the downlink data is sent by unicast delivery.

Operation 3, the MC gateway UE (300) forwards the downlink data to the MC client (100).

Operation 4, the MC service server (400) establishes the MBMS bearer(s) for the group communication session according to the procedures defined in 3GPP TS 23.468. Service description associated with the MBMS bearer(s) is returned from the BM-SC.

Operation 5, the MC service server (400) provides service description information associated with the MBMS bearer to the MC gateway UE (300). The MC gateway UE (300) obtains the TMGI from the announcement message. This message may be sent on an application level control signaling bearer. The MC service server (400) can choose to send the MBMS bearer announcement only to the MC gateway UE (300) instead of sending to all the MC clients (100) it is serving or to both the MC gateway UE (300) and the MC clients (100) residing on the non 3GPP devices (200) and accessing the MC system through this MC gateway UE (300).

Operation 6, the MC gateway UE (300) starts monitoring data over MBMS associated with the TMGI, while in the service area associated with the TMGI.

Operation 7, the MC gateway UE (300) detects that it is able to receive data over MBMS associated with the TMGI.

Operation 8, the MC gateway notifies the MC service server (400) the MBMS listening status associated to the monitored TMGI, (e.g., that it is successfully receiving the TMGI). The MC gateway UE (300) may also notify the MBMS reception quality level of the TMGI. MC service server (400) shall treat the MBMS listening status report received from the MC gateway UE (300) as if it is received from all the MC clients (100) residing on the non 3GPP devices (200) and accessing the MC system through the MC gateway UE (300). The MC service server (400) stops sending media data over unicast way to the MC client (100).

The MBMS reception quality level may be used by the MC service server (400) to make an efficient decision to switch again to a unicast transmission or to take measures to prepare such a switch (e.g., when the quality level indicates that the reception quality of the MBMS bearer is decreasing or reaching an insufficient quality level for the reception of MC services).

Operation 9, the MC gateway UE (300) confirms the MC client (100) that it is able to listen on the MBMS bearer by sending the MC GW MBMS Listening Status Report/Notify. The MC GW MBMS Listening Status Report also contains the details of the non 3GPP transport communication related parameters.

Operation 10, the MC client (100) establishes the communication channel with the MC gateway UE (300) based on the parameters received in operation 9 to receive the MC service data from the MC gateway UE (300). This allows the MC gateway UE (300) to forward the MC service data it received over the MBMS bearer from the MC service server (400) to the MC client (100) over this communication channel.

Operation 11, an MC service group communication session via dynamic MBMS bearer(s) is established.

Operation 12, the MC service server (400) sends the downlink media for the group communication session over the MBMS.

Operation 13, the MC gateway UE (300) then forwards the received data to the MC clients (100) residing on the non 3GPP devices (200) over the communication channel as established in operation 10.

Handling of MapGroupToBearer Message

Figure 10:
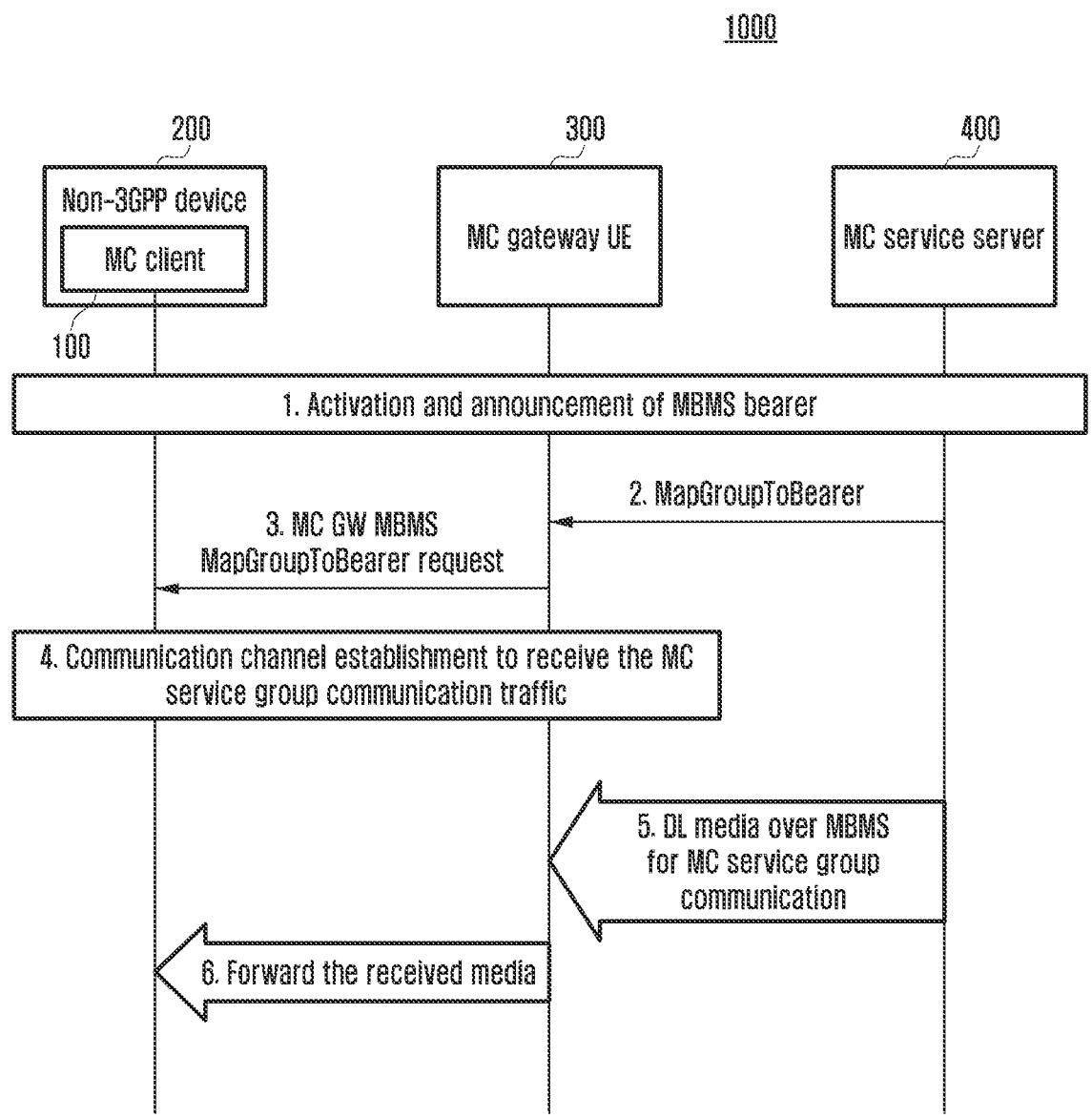
FIG. 10 depicts a scenario, in which a group session is setup before a group communication start, according to an embodiment of the disclosure.

FIG. 10 depicts a scenario, in which a group session is setup before a group communication start, according to an embodiment of the disclosure.

The MBMS bearer can be used for MC service group communications. One MBMS bearer is not permanently associated to one specific group or group communication. Before sending media packets of the group communication over the MBMS bearer, the MC service server (400) shall send the association information between group communication and the MBMS bearer to the MC gateway UE (300). The group communication setup procedure indicates the media stream or media streams within one MBMS bearer that is used for the specific MC service group communication. When the group communication over the MBMS bearer is finished, this temporary association information of the MC service group call to specific resources on an MBMS bearer is undone.

Referring to FIG. 10, the procedure in FIG. 10 requires that the group session is setup before the group communication start. This eliminates the need for the receiving clients to continuously use the unicast bearer. Prior to this the MBMS bearer is activated and announced to the MC gateway UE (300).

There needs to be the mapping between the 3GPP transport side MBMS bearer association with the MC service group communication and the non-3GPP transport side communication channel association with MC service group communication. On the non 3GPP transport side, the communication channel could be either multicast or unicast. Once this association between the 3GPP transport and the non 3GPP transport is made, the MC clients (100) receiving the multicast data from the MC gateway UE (300) would be able to associate the received data to a particular MC service group communication and process them accordingly. The MC GW MapgroupToBearer message is used to establish this association.

MC GW MapGroupToBearer

Table 10 describes the information flow from the MC gateway UE (300) to the MC client (100) for the MC GW MapGroupToBearer.

TABLE 10

| Information element | Status | Description |
| --- | --- | --- |
| MC Service Group ID | M | MC Service Group ID in which group communication is started |
| Non 3GPP transport channel establishment parameters | M | This elements contains the details of the non 3GPP channel establishment parameters (IP address, Port etc.,) which is used by the MC gateway UE to forward the MC service Group communication data received over 3GPP MBMS bearer to the MC client |

These parameters are implementation specific and are dependent on the non 3GPP transport mechanism used between the MC client and MC gateway UE Below are the pre-conditions for the procedures explained in the FIG. 10.

All users participating in the MCVideo group call are already affiliated to the group.

All participating users have joined the group session.

Operation 1, activation and announcement of MBMS bearer availability.

Operation 2, the MC service server (400) will send a MapGroupToBearer message over the previously activated MBMS bearer to all users that will receive the MC service group over the MBMS bearer. The MapGroupToBearer message includes association information between the MC service group communication and the MBMS bearer. The MapGroupToBearer message includes the MC service group ID and information about the media stream identifier or media stream identifiers of the activated MBMS bearer and may include the identifier (i.e., the TMGI) of the MBMS bearer broadcasting the MC service group communication.

Operation 3, the MC gateway UE (300) sends the MC GW MBMS MapGroupToBearer to the MC client (100) containing the information received in MapGroupToBearer message and also the details of the communication channel association on non 3GPP transport side between the MC client (100) and the MC gateway UE (300).

Operation 4, based on the information received in operation 3, the MC client (100) establishes the communication channel with MC gateway UE (300) to receive the MC service group data sent over the MBMS channel on the 3GPP transport side. This communication channel could be unicast or multicast and is left to the implementation.

Operation 5, the media corresponding to the MC service group communication is sent over the MBMS bearer by the MC service server (400).

Operation 6, the MC gateway UE (300) forwards the received media over the MBMS bearer to the MC client (100) using the communication channel established as in operation 4.

MBMS Bearer Quality Detection

Since the MC gateway UE (300) is listening on the MBMS bearer, it has to report the MBMS bearer quality to the MC service server (400). The MC gateway UE (300) monitors an MBMS bearer to receive MC service media. Based on the received quality (e.g., radio level quality, transport level quality), the MC gateway UE (300) needs to inform the MC service server (400), that the MC gateway UE (300) is able to receive the MC service media on the MBMS bearer with sufficient quality or not. Furthermore, based on the received quality, the MC gateway UE (300) may notify the MC service server (400) at which the MBMS reception quality level it has received the MC service media on the MBMS bearer.

The issue can be more complex since the MC gateway UE (300) needs to estimate the quality of the bearer even in the scenario when there are no data currently transmitted on the MBMS bearer (e.g., between MCPTT group call). The reason for this is that an MC gateway UE (300) that has entered an area with significantly degraded MBMS quality, might not even notice that an MC service communication is ongoing, meanwhile the MC server assumes that the MC gateway UE (300) can receive the media being broadcasted.

In order to estimate the MBMS bearer quality, for example as an equivalent BLER (Block Error Rate), when no data is sent is implementation specific. This estimation can be dependent on for example the modulation and coding scheme (MCS) and measurements from the reference signals from the eNB(s). Other metrics (e.g., RTP packet loss) may be used to estimate the MBMS bearer quality.

The MC gateway UE (300) follows the procedure as described in 10.7.3.6 of TS 23.280 and it acts as the MC service UE. On receiving the MBMS listening status report from the MC gateway UE (300), the MC service server (400) considers as if it has received the MBMS listening status report from all the MC clients (100) which are accessing the MC system via this MC gateway UE (300) and to which the established MBMS bearer is applicable.

Procedures

Figure 11:
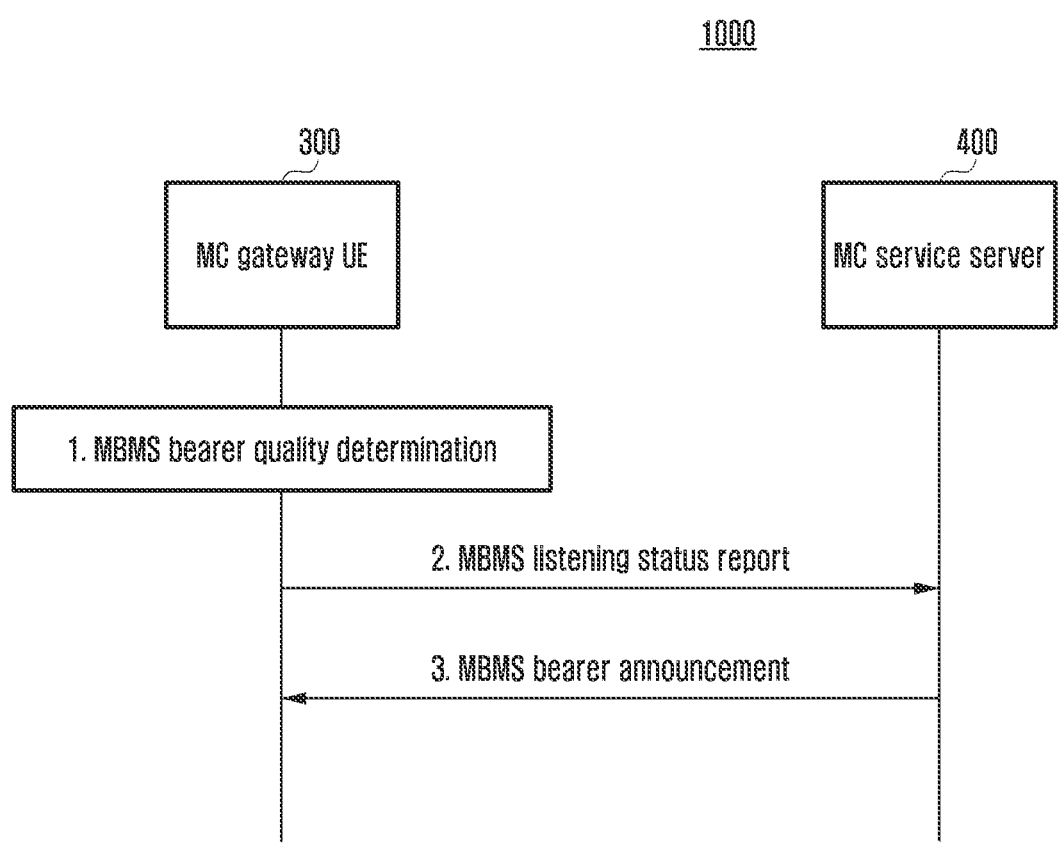
FIG. 11 depicts the process of detecting MBMS bearer quality, according to an embodiment of the disclosure.

FIG. 11 depicts the process of detecting MBMS bearer quality, according to an embodiment of the disclosure.

Embodiments herein propose that the MC gateway UE (300) follows the procedure as described in 3GPP TS 23.280 Section 10.7.3.6 to determine the MBMS bearer quality. The MC gateway UE (300) informs the MC service server (400) about the MBMS bearer quality. FIG. 11 describes this procedure.

Below are the pre-conditions for the procedures explained in the FIG. 11.

There is an MBMS bearer activated and the MBMS bearer information is announced to the MC gateway UE (300).

The MC gateway UE (300) is located in the MBMS broadcasting area.

The MC gateway UE (300) monitors SIB-13 (or SIB-20) and (SC-) MCCH to receive the modulation and coding scheme.

The MC gateway UE (300) monitors the cell specific reference signal and when MBSFN transmission is used, the MBSFN specific reference signals.

Referring to FIG. 11, operation 1, the MC gateway UE (300) determines the MBMS bearer quality. Operation 2, the MC gateway UE (300) sends the MBMS listening status report including the MBMS reception quality level to the MC service server (400). At operation 3, the MC service server (400) sends the MBMS bearer announcement to the MC gateway UE (300) based on the MBMS listening status report.

In another embodiment, the MC gateway UE (300) follows the Operation 1 of the procedure as described in 3GPP TS 23.280 Section 10.7.3.6.2 for the MC service UE. Instead of reporting the bearer quality to the MC service server (400) it has to inform all the MC clients (100) which has asked the MC gateway UE (300) to listen on the particular MBMS bearer.

If the MBMS bearer quality reaches a certain threshold, the MC gateway UE (300) sends an MC GW MBMS listening status report to the MC client (100). The threshold is used to define the MBMS listening status, which indicates if the MBMS bearer quality has been acceptable or not to receive a specific MC service media. If the MBMS bearer quality is mapped to a different MBMS reception quality level, the MC gateway UE (300) may send an MBMS listening status report including the MBMS reception quality level to the MC client (100).

The MC client (100) sends the MBMS Listening Status report to the MC Service server (400) via the MC gateway UE (300) containing the information received in the MC GW MBMS Listening status report.

The MC service server (400) may send additional proposal for measurements; e.g., information about neighboring MBMS bearers. This message may be an MBMS bearer announcement message.

MBMS Bearer Suspension Notification

The MC service server (400) can choose to instruct MC gateway UE (300) to send the MBMS bearer suspension report when notified by the RAN (500). When the RAN (500) decides to suspend the MBMS bearer it indicates the MC gateway UE (300). The MC gateway can then decide to send the MBMS bearer suspension report to the MC service server (400) only if they are instructed by the MC service server (400). On receiving the MBMS bearer suspension report from the MC gateway UE (300), the MC service server (400) considers it as if it is received from all the MC clients (100) residing on the non 3GPP devices (200) and accessing the MC system through this MC gateway UE (300) for any decision making purpose.

Figure 12:
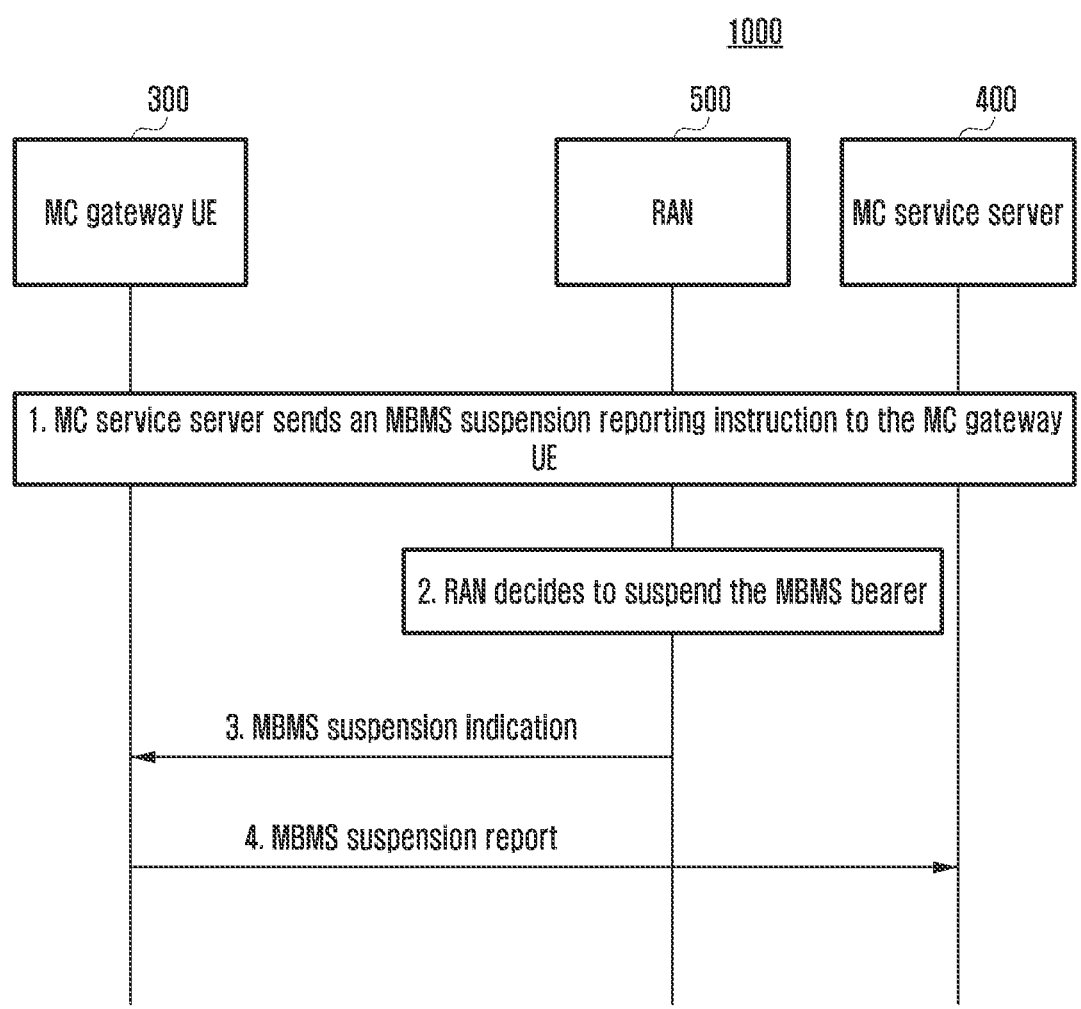
FIG. 12 describes a procedure for how an MC gateway UE reports an MBMS bearer suspension to the MC server, according to an embodiment of the disclosure.

FIG. 12 describes the procedure for how an MC gateway UE reports the MBMS bearer suspension to the MC server when instructed according to an embodiment of the disclosure. In this procedure, the MC gateway UE (300) is requested by the MC service server (400) to send an MBMS suspension report. This request for MBMS suspension report can be included in the MBMS bearer announcement.

Referring to FIG. 12, below are the pre-conditions for the procedures explained in the FIG. 12.

It is assumed that there is at least one active MBMS bearer.

Procedure Operations:

Operation 1, the MC service server (400) sends the MBMS suspension reporting instruction to the MC gateway UE (300). This message may be included in the MBMS bearer announcement message and may be sent both on a unicast bearer and a multicast bearer.

Operation 2, the RAN (500) decides to suspend the MBMS bearer, according to existing procedures in 3GPP TS 36.300.

Operation 3, the MBMS suspension indication is sent to the MC gateway UE (300) in the MSI (MCH Scheduling Information), according to existing procedures in 3GPP TS 36.300.

Operation 4, the MC gateway UE (300) detect the MBMS suspension and sends MBMS suspension report to the MC Service server (400).

Use of MBMS Bearer for Application Level Control Signaling:

The MC service server (400) may use an MBMS bearer for application level control signaling, according to this subclause. An MBMS bearer for application level control signaling is typically used for the purposes beyond the benefit for using MBMS for resource efficiency, e.g., for improved MC service performance (KPIs), handling of high load scenarios.

The MBMS bearer for application level control signaling may be used to transmit the following messages:

a. Transmission control (e.g., call setup and floor control),
b. Group application paging,
c. Group dynamic data (e.g., status of the group), and
d. Group state (e.g., emergency alerts).

The MBMS bearer for application level control signaling is activated in a service area that is larger than the estimated service for media bearers. The service area for the media bearers mainly based on counting of group members in each defined service area. The MBMS bearer for application level control signaling is also activated with a QoS that is better than MBMS media bearers since the packet loss requirements are much stricter.

The MC client (100) shall not send responses to group-addressed application level control signaling unless instructed or configured to respond.

FIG. 13 depicts a procedure, wherein only one of the receiving MC service clients uses an MBMS bearer, according to an embodiment of the disclosure.

Referring to FIG. 13, the procedure in FIG. 13 shows only one of the receiving MC service clients using the MBMS bearer.

Operation 1, the MC service server (400) determines to activate MBMS bearer for application level control signaling, The activation of the MBMS bearer is done on the MB2-C reference point and according to 3GPP TS 23.468.

Operation 2, the MC service server (400) passes the MBMS bearer info for the service description associated MBMS bearer to the MC gateway UE (300). The MC gateway UE (300) obtains the TMGI, identifying the MBMS bearer, from the service description.

Operation 3, the MC gateway UE (300) stores the information associated with the TMGI. The MC gateway UE (300) uses the TMGI and other MBMS bearer related information to activate the monitoring of the MBMS bearer.

Operation 4, the MC gateway UE (300) that enters or is in the service area of the announced TMGI indicates to the MC service server (400) that the MC gateway UE (300) is able to receive application level control messages over the MBMS bearer. The MC gateway UE (300) may also indicate at which MBMS reception quality level it has received the MC service media on the MBMS bearer. Hence, the MC service server (400) may decide to use the MBMS bearer for MC application control messages.

Operation 5, the MC Gateway UE (300) informs the MC client (100) that it is able to listen on the MBMS bearer by sending the MC GW MBMS Listening Status Report/Notify. The MC GW MBMS listening status report also contains the details of the non 3GPP transport communication related parameters.

Operation 6, the MC client (100) establishes the communication channel with the MC gateway UE (300) based on the parameters received in operation 5 to receive the MC service data from the MC gateway UE (300). This allows MC gateway UE (300) to forward the MC service data it received over the MBMS bearer from the MC service server (400) to the MC client (100) over the communication channel.

Operation 7, the MC service server (400) transmit MC application control messages.

Operation 8, the MC gateway forwards the MC application control messages to the MC client (100) over the communication channel as established in operation 6.

Embodiments herein enable the MC system to operate in an efficient way and harness the benefit of using MBMS services.

Figure 14A:
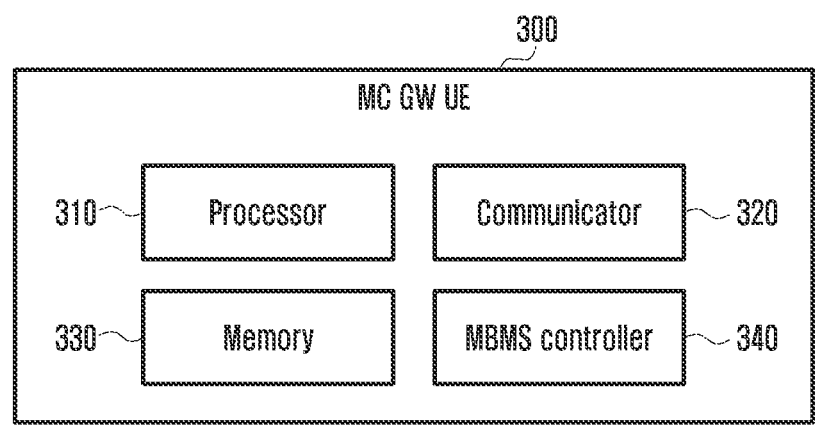
FIG. 14A illustrates various hardware components of the MC GW UE, according to an embodiment of the disclosure.

FIG. 14A illustrates various hardware components of the MC GW UE, according to embodiments as disclosed herein. In an embodiment, the MC GW UE (300) includes a processor (310), a communicator (320), a memory (330) and an MBMS controller (340). The processor (310) is coupled with the communicator (320), the memory (330) and the MBMS controller (340).

The MBMS controller (340) receives the MC gateway MBMS bearer announcement from the MC client (100) in response to receiving information associated with the MBMS bearer and the service description associated with the MBMS bearer from the MC service server (400). The MC GW MBMS bearer announcement includes the MBMS bearer related information.

Further, the MBMS controller (340) stores information associated with the identifier at the MC gateway UE (300) in response to receiving the MC gateway MBMS bearer announcement from the MC client (100). The MC gateway UE (300) uses the identifier and the information to activate for monitoring the MBMS bearer by the MC gateway UE (300).

Further, the MBMS controller (340) sends the MBMS listening status report to the MC client (100) based on the MC GW MBMS bearer announcement. Further, the MBMS controller (340) establishes the communication channel with the MC client (100) based on the parameter to receive the MC service data from the MC gateway UE (300). The MC gateway UE (300) forwards the MC service data to the MC client (100).

Further, the MBMS controller (340) sends the MC GW MBMS bearer quality report to the MC client (100). Further, the MBMS controller (340) receives the MBMS listening status report from the MC client (100) based on the MC GW MBMS bearer quality report to send or forward to the MC service server (400). The MBMS listening status report comprises the MC GW MBMS bearer quality report and the information about the neighboring MBMS bearer.

The MBMS controller (340) receives the MC GW MapGroupToBearer request message from the MC client (100) in response to receiving the MapGroupToBearer message, at the MC client (100), from the MC service server (400) over the previously activated MBMS bearer. The MC GW MapGroupToBearer request message comprises details comprises in the MapGroupToBearer message. The MBMS controller (340) maintains the association between the GW MC service ID and corresponding MBMS sub channel based on the MC GW MapGroupToBearer request message. The MBMS controller (340) sends the MC GW MapGroupToBearer response message to the MC client (100) based on the MC GW MapGroupToBearer request message. The MC GW MapGroupToBearer response message comprises details of non 3GPP transport communication related parameters. Further, the MBMS controller (340) establishes the communication channel with the MC client (100) based on the non 3GPP transport communication related parameters to receive an MC service group communication data from the MC gateway UE (300). Further, the MBMS controller (340) sends the downlink media received over the MBMS bearer to the MC client (100).

Further, the MBMS controller (340) receives the MBMS suspension indication message from the wireless network (1000). The MBMS suspension reporting instruction message is included in the MBMS bearer announcement message. Further, the MBMS controller (340) sends the MC GW MBMS suspension indication to the MC client (100). The MC client (100) sends the MBMS suspension report to the MC service server (400) via the MC gateway UE (300) based on the MBMS suspension reporting instruction message and the MC GW MBMS suspension indication.

The MBMS controller (340) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (310) is configured to execute instructions stored in the memory (330) and to perform various processes. The communicator (320) is configured for communicating internally between internal hardware components and with external devices via one or more networks. The memory (330) also stores instructions to be executed by the processor (310). The memory (330) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (330) is non-movable. In certain examples, a non-transitory storage medium may store data that can, over time, change (e.g., in Random Access Memory (RAM) or cache).

Further, at least one of the pluralities of modules/controller may be implemented through the Artificial Intelligence (AI) model using a data driven controller (not shown). The data driven controller can be a Machine learning (ML) model based controller and AI model based controller. A function associated with the AI model may be performed through the non-volatile memory, the volatile memory, and the processor (310). The processor (310) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Referring to FIG. 14A shows various hardware components of the MC GW UE (300) but it is to be understood that other embodiments are not limited thereon according to an embodiment of the disclosure. In other embodiments, the MC GW UE (300) may include less or more number of components. Further, the labels or names of the components are used only for illustrative purpose and does not limit the scope of the disclosure. One or more components can be combined together to perform same or substantially similar function in the MC GW UE (300).

Figure 14B:
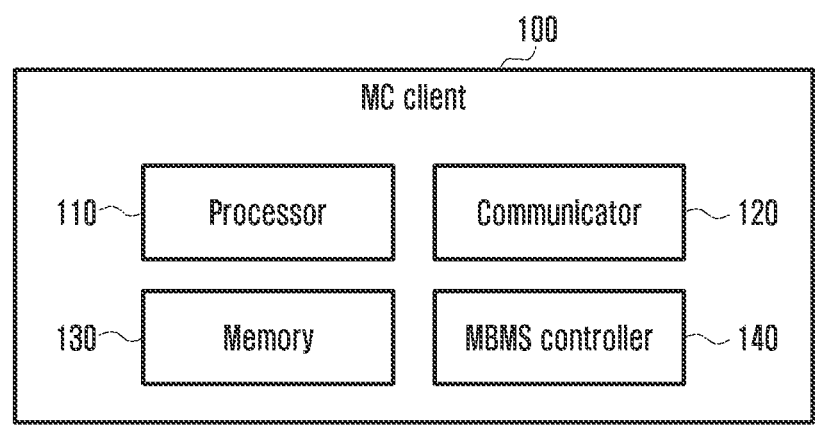
FIG. 14B illustrates various hardware components of the MC client, according to an embodiment of the disclosure.

FIG. 14B illustrates various hardware components of the MC client (100), according to an embodiment of the disclosure. In an embodiment, the MC client (100) includes a processor (110), a communicator (120), a memory (130) and an MBMS controller (140). The processor (110) is coupled with the communicator (120), the memory (130) and the MBMS controller (140).

The MBMS controller (140) sends the MC GW MBMS bearer announcement to the MC gateway UE (300) in response to receiving information associated with the MBMS bearer and the service description associated with the MBMS bearer from the MC service server (400). Based on the MC GW MBMS bearer announcement, the MBMS controller (140) receives the MBMS listening status report from the MC gateway UE (300). Further, the MBMS controller (140) establishes the communication channel with the MC gateway UE (300) based on at least one parameter to receive MC service data from the MC gateway UE (300).

Further, the MBMS controller (140) shares the MBMS listening status report to the MC service server (400) based on the MC GW MBMS listening status report. The MBMS listening status report indicates that the MC client (100) receives the media over the MBMS bearer.

Further, the MBMS controller (140) receives the MC GW MBMS bearer quality report from the MC gateway UE (300). Based on the MC GW MBMS bearer quality report, the MBMS controller (140) shares the MBMS listening status report to the MC service server (400). The MBMS listening status report includes at least one of the MC GW MBMS bearer quality report and information about neighboring MBMS bearer.

Further, the MBMS controller (140) receives the MapGroupToBearer message from the MC service server (400) over the previously activated MBMS bearer. Further, the MBMS controller (140) sends the MC GW MapGroupToBearer request message to the MC gateway UE (300). The MC GW MapGroupToBearer request message includes details comprised in the MapGroupToBearer message. Based on the MC GW MapGroupToBearer request message, the MBMS controller (140) receives the MC GW MapGroupToBearer response message from the MC gateway UE (300). The MC GW MapGroupToBearer response message comprises details of non 3GPP transport communication related parameters. Further, the MBMS controller (140) establishes the communication channel with the MC gateway UE (300) based on the non 3GPP transport communication related parameters to receive an MC service group communication data from the MC gateway UE (300). Further, the MBMS controller (140) receives the downlink media from the MC gateway UE (300).

Further, the MBMS controller (140) receives the MBMS suspension reporting instruction message from the MC service server (400). The MBMS suspension reporting instruction message is included in the MBMS bearer announcement message. Further, the MBMS controller (140) receives the MC GW MBMS suspension indication from the MC gateway UE (300). Further, the MBMS controller (140) sends the MBMS suspension report to the MC service server (400) via the MC gateway UE (300) based on the MBMS suspension reporting instruction message and the MC GW MBMS suspension indication.

The MBMS controller (140) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller (not shown). The data driven controller can be a ML model based controller and AI model based controller. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Referring to FIG. 14B shows various hardware components of the MC client (100) but it is to be understood that other embodiments are not limited thereon. In other embodiments, the MC client (100) may include less or more number of components. Further, the labels or names of the components are used only for illustrative purpose and does not limit the scope of the disclosure. One or more components can be combined together to perform same or substantially similar function in the MC client (100).

Figure 15:
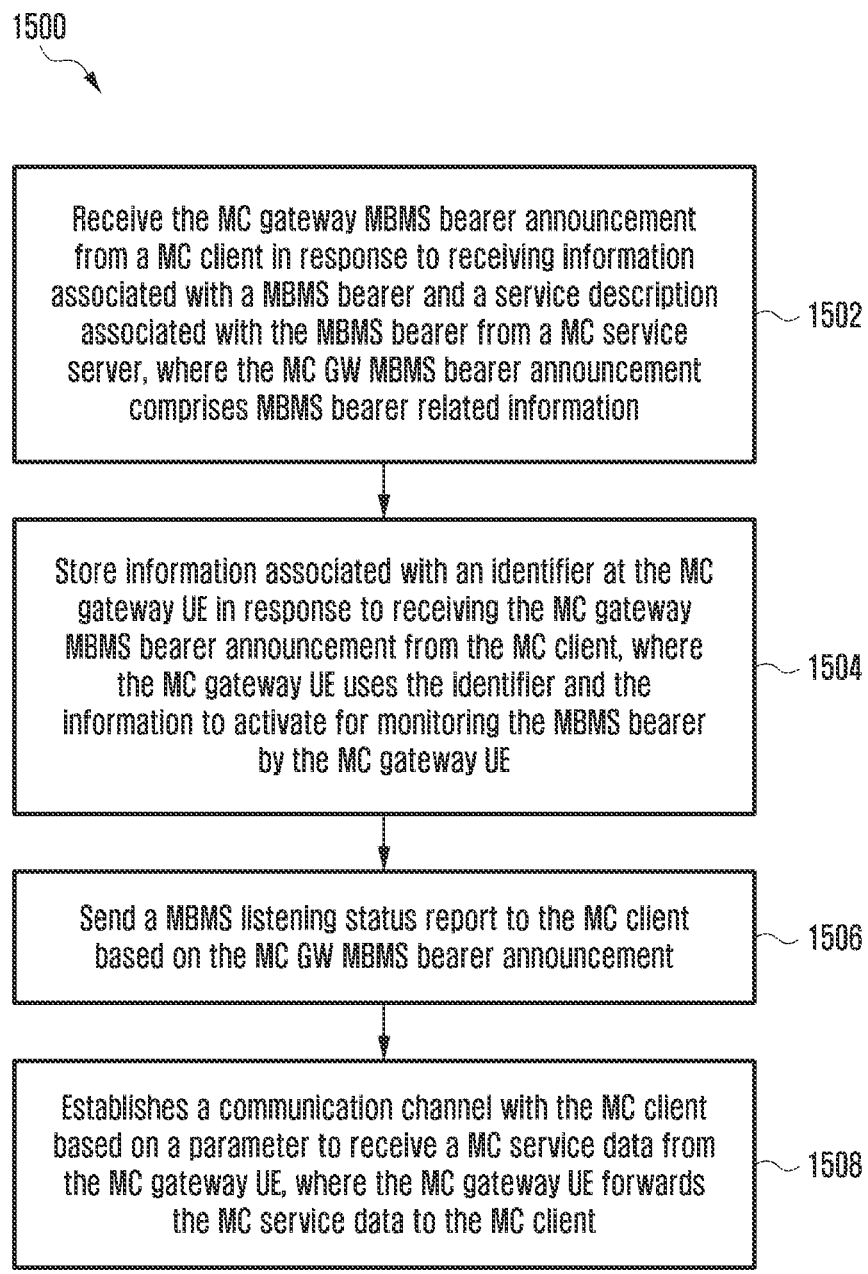
FIG. 15 is a flow chart illustrating a method, implemented by the MC GW UE, for handling the MBMS in the wireless network, according to an embodiment of the disclosure.

FIG. 15 is a flow chart illustrating a method, implemented by an MC GW UE, for handling an MBMS in a wireless network, according to an embodiment of the disclosure. The operations (1502-1508) are handled by the MBMS controller (340).

At operation 1502 of the flow chart 1500, the method includes receiving the MC gateway MBMS bearer announcement from the MC client (100) in response to receiving information associated with the MBMS bearer and the service description associated with the MBMS bearer from the MC service server (400). The MC GW MBMS bearer announcement includes the MBMS bearer related information. At operation 1504, method includes storing the information associated with the identifier at the MC gateway UE (300) in response to receiving the MC gateway MBMS bearer announcement from the MC client (100), where the MC gateway UE (300) uses the identifier and the information to activate for monitoring the MBMS bearer by the MC gateway UE (300).

At operation 1506, method includes sending the MBMS listening status report to the MC client (100) based on the MC GW MBMS bearer announcement. At operation 1508, the method includes establishing the communication channel with the MC client (100) based on the parameter to receive the MC service data from the MC gateway UE (300). The MC gateway UE (300) forwards the MC service data to the MC client (100).

Figure 16:
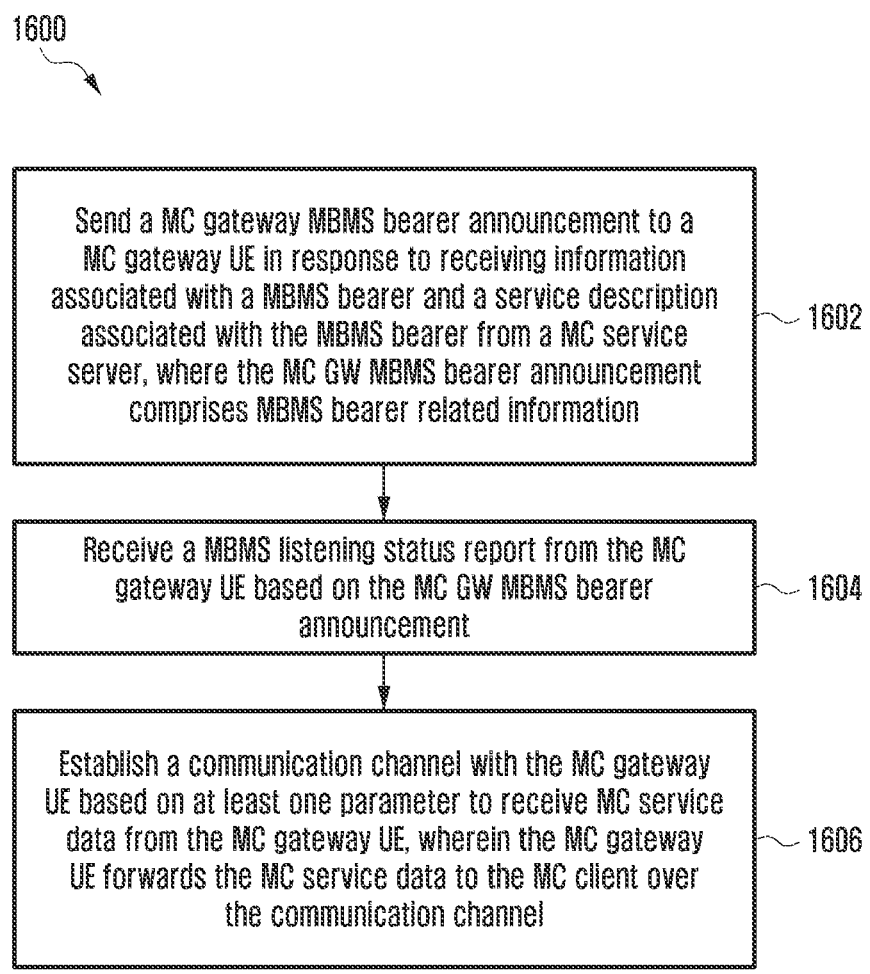
FIG. 16 is a flow chart illustrating a method, implemented by the MC client, for handling the MBMS in the wireless network, according to an embodiment of the disclosure.

FIG. 16 is a flow chart illustrating a method, implemented by the MC client, for handling an MBMS in a wireless network, according to an embodiment of the disclosure. The operations (1602-1606) of flow chart 1600 are handled by the MBMS controller (140).

At operation 1602, the method includes sending the MC GW MBMS bearer announcement to the MC gateway UE (300) in response to receiving information associated with the MBMS bearer and the service description associated with the MBMS bearer from the MC service server (400). The MC GW MBMS bearer announcement includes the MBMS bearer related information.

At operation 1604, the method includes receiving the MBMS listening status report from the MC gateway UE (300) based on the MC GW MBMS bearer announcement. At operation 1606, the method includes establishing the communication channel with the MC gateway UE (300) based on the at least one parameter to receive MC service data from the MC gateway UE (300). The MC gateway UE (300) forwards the MC service data to the MC client (100) over the communication channel.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a mission critical (MC) gateway (GW) user equipment (UE) supporting a multimedia broadcast multicast services (MBMS) in a wireless communication system, the method comprising:
receiving, from an MC client, an MC GW MBMS bearer announcement including MBMS bearer related information;
storing information associated with at least one temporary mobile group identity (TMGI);
activating a monitoring of an MBMS bearer based on the at least one TMGI and other MBMS bearer related information;
transmitting, to the MC client, an MC GW MBMS listening status report including non-$3^{rd}$ generation partnership project (3GPP) transport resources related parameters, wherein transport resources are established between the MC client and the MC GW UE based on the non-3GPP transport resources related parameters;
receiving, from an MC service server, MC service data over the MBMS bearer; and
forwarding, to the MC client, the MC service data over the transport resources,
wherein the MC client resides on a non-3GPP device.

2. The method of claim 1, wherein service description information associated with the MBMS bearer is provided from the MC service server to the MC client residing on the non-3GPP device via the MC GW UE.

3. The method of claim 1, further comprising:
receiving, from the MC client, an MBMS listening status report, wherein the MBMS listening status report indicates that the MC client is able to receive media over MBMS; and
transmitting, to the MC service server, the MBMS listening status report.

4. The method of claim 1, wherein the MC client has been configured with necessary parameters to enable a use of the MC GW UE.

5. The method of claim 1,
wherein the MC GW MBMS bearer announcement includes at least one of an MC GW service identifier (ID), a TMGI, a list of service area identifier, a frequency, session description protocol (SDP) information, a monitoring state, or robust header compression (ROHC) information, and
wherein the MC GW MBMS listening status report includes at least one of a TMGI, an MBMS listening status, an MBMS reception quality level, or non-3GPP transport channel establishment parameters.

6. A method performed by a mission critical (MC) client supporting a multimedia broadcast multicast services (MBMS) in a wireless communication system, the method comprising:
sending, to an MC gateway (GW) user equipment (UE), an MC GW MBMS bearer announcement including MBMS bearer related information;
receiving, from the MC GW UE, an MC GW MBMS listening status report including non-3rd generation partnership project (3GPP) transport resources related parameters, wherein transport resources are established between the MC client and the MC GW UE based on the non-3GPP transport resources related parameters; and
receiving, from the MC GW UE, MC service data over the transport resources, wherein the MC service data is received over an MBMS bearer from an MC service server,
wherein a monitoring of the MBMS bearer is activated based on at least one temporary mobile group identity (TMGI) and other MBMS bearer related information, and
wherein the MC client resides on a non-3GPP device.

7. The method of claim 6, further comprising:
receiving, from the MC service server, service description information associated with the MBMS bearer.

8. The method of claim 6, further comprising:
transmitting, to the MC service server, an MBMS listening status report, wherein the MBMS listening status report indicates that the MC client is able to receive media over MBMS.

9. The method of claim 6, wherein the MC client has been configured with necessary parameters to enable an use of the MC GW UE.

10. The method of claim 6,
wherein the MC GW MBMS bearer announcement includes at least one of an MC GW service identifier (ID), a temporary mobile group identity (TMGI), a list of service area identifier, a frequency, session description protocol (SDP) information, a monitoring state, or robust header compression (ROHC) information, and
wherein the MC GW MBMS listening status report includes at least one of a TMGI, an MBMS listening status, an MBMS reception quality level, or non-3GPP transport channel establishment parameters.

11. A mission critical (MC) gateway (GW) user equipment (UE) supporting a multimedia broadcast multicast services (MBMS) in a wireless communication system, the MC gateway UE comprising:
a transceiver; and
a controller coupled with the transceiver, and configured to:
receive, from an MC client, an MC GW MBMS bearer announcement including MBMS bearer related information,
store information associated with at least one temporary mobile group identity (TMGI),
activate a monitoring of an MBMS bearer based on the at least one TMGI and other MBMS bearer related information,
transmit, to the MC client, an MC GW MBMS listening status report including non-$3^{rd}$ generation partnership project (3GPP) transport resources related parameters, wherein transport resources are established between the MC client and the MC GW UE based on the non-3GPP transport resources related parameters,
receive, from an MC service server, MC service data over the MBMS bearer, and
forward, to the MC client, the MC service data over the transport resources,
wherein the MC client resides on a non-3GPP device.

12. The MC gateway UE of claim 11, wherein service description information associated with the MBMS bearer is provided from the MC service server to the MC client residing on the non-3GPP device via the MC GW UE.

13. The MC gateway UE of claim 11, wherein the controller is further configured to:

receive, from the MC client, an MBMS listening status report, wherein the MBMS listening status report indicates that the MC client is able to receive media over MBMS, and transmit, to the MC service server, the MBMS listening status report.

14. The MC gateway UE of claim 11, wherein the MC client has been configured with necessary parameters to enable a use of the MC GW UE.

15. The MC gateway UE of claim 11, wherein the MC GW MBMS bearer announcement includes at least one of an MC GW service identifier (ID), a TMGI, a list of service area identifier, a frequency, session description protocol (SDP) information, a monitoring state, or robust header compression (ROHC) information, and wherein the MC GW MBMS listening status report includes at least one of a TMGI, an MBMS listening status, an MBMS reception quality level, or non-3GPP transport channel establishment parameters.

16. A mission critical (MC) client supporting a multimedia broadcast multicast services (MBMS) in a wireless communication system, the MC client comprising:

a transceiver; and a controller coupled with the transceiver, and configured to:

send, to an MC gateway (GW) user equipment (UE), an MC GW MBMS bearer announcement including MBMS bearer related information, receive, from the MC GW UE, an MC GW MBMS listening status report including non-3rd generation partnership project (3GPP) transport resources related parameters, wherein transport resources are established between the MC client and the MC GW UE based on the non-3GPP transport resources related parameters, and receive, from the MC GW UE, MC service data over the transport resources, wherein the MC service data is received over an MBMS bearer from an MC service server, wherein a monitoring of the MBMS bearer is activated based on at least one temporary mobile group identity (TMGI) and other MBMS bearer related information, and wherein the MC client resides on a non-3GPP device.

17. The MC client of claim 16, wherein the controller is further configured to:

receive, from the MC service server, service description information associated with the MBMS bearer.

18. The MC client of claim 16, wherein the controller is further configured to:

transmit, to the MC service server, an MBMS listening status report, wherein the MBMS listening status report indicated that the MC client is able to receive media over MBMS.

19. The MC client of claim 16, wherein the MC client has been configured with necessary parameters to enable an use of the MC GW UE.

20. The MC client of claim 16, wherein the MC GW MBMS bearer announcement includes at least one of an MC GW service identifier (ID), a temporary mobile group identity (TMGI), a list of service area identifier, a frequency, session description protocol (SDP) information, a monitoring state, or robust header compression (ROHC) information, and wherein the MC GW MBMS listening status report includes at least one of a TMGI, an MBMS listening status, an MBMS reception quality level, or non-3GPP transport channel establishment parameters.

* * * * *